US012552369B2

(12) United States Patent
Naganawa et al.

(10) Patent No.: US 12,552,369 B2
(45) Date of Patent: Feb. 17, 2026

(54) INFORMATION PROCESSING APPARATUS, MOVABLE APPARATUS, INFORMATION PROCESSING METHOD, AND STORAGE MEDIUM

(71) Applicant: CANON KABUSHIKI KAISHA, Tokyo (JP)

(72) Inventors: Yoshihiro Naganawa, Tochigi (JP); Kohei Iwabuchi, Kanagawa (JP); Masakazu Fujiki, Kanagawa (JP); Daisuke Kotake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 18/377,322

(22) Filed: Oct. 6, 2023

(65) Prior Publication Data

US 2024/0116500 A1 Apr. 11, 2024

(30) Foreign Application Priority Data

Oct. 11, 2022 (JP) .................................. 2022-163188
Dec. 13, 2022 (JP) .................................. 2022-198567

(51) Int. Cl.
*B60W 30/09* (2012.01)
*B60W 50/14* (2020.01)

(52) U.S. Cl.
CPC ............ *B60W 30/09* (2013.01); *B60W 50/14* (2013.01); *B60W 2050/146* (2013.01); *B60W 2554/80* (2020.02)

(58) Field of Classification Search
CPC .. B60W 30/09; B60W 50/14; B60W 2554/80; B60W 2050/146
See application file for complete search history.

(56) References Cited

U.S. PATENT DOCUMENTS

| 11,185,977 B2 | 11/2021 | Kobayashi et al. |
| 2013/0222592 A1 | 8/2013 | Gieseke |
| 2014/0104078 A1 | 4/2014 | Urano et al. |
| 2018/0081357 A1 | 3/2018 | Datta Gupta et al. |
| 2019/0026918 A1 | 1/2019 | Gomezcaballero et al. |
| 2020/0217952 A1 | 7/2020 | Rider et al. |

(Continued)

FOREIGN PATENT DOCUMENTS

| JP | H11-023716 A | 5/1989 |
| JP | 2006-185438 A | 7/2006 |

(Continued)

OTHER PUBLICATIONS

Co-pending U.S. Appl. No. 18/493,368, filed Oct. 24, 2023.

(Continued)

*Primary Examiner* — Michael D Lang
(74) *Attorney, Agent, or Firm* — Venable LLP

(57) ABSTRACT

To provide an information processing apparatus capable of improving the efficiency of operation of a movable apparatus, an information processing apparatus comprises: a passing region calculation unit configured to calculate a passing region through which a movable apparatus passes; an object detection unit configured to detect an object around the movable apparatus by a sensor; and an object detection range setting unit configured to set an object detection range in which the object is detected by the object detection unit based on the passing region calculated by the passing region calculation unit.

24 Claims, 19 Drawing Sheets

(56) References Cited

U.S. PATENT DOCUMENTS

| | | | |
|---|---|---|---|
| 2022/0067367 A1* | 3/2022 | Watanabe | G06V 20/58 |
| 2022/0281464 A1 | 9/2022 | Sandblom et al. | |
| 2023/0030791 A1 | 2/2023 | Miyatani et al. | |
| 2023/0075998 A1* | 3/2023 | Lee | B62D 15/0265 |
| 2023/0110992 A1 | 4/2023 | Numakami et al. | |
| 2023/0134912 A1 | 5/2023 | Wanda et al. | |
| 2023/0243667 A1 | 8/2023 | Miyakawa et al. | |
| 2023/0342956 A1 | 10/2023 | Ohira et al. | |

FOREIGN PATENT DOCUMENTS

| | | | |
|---|---|---|---|
| JP | 2007-172541 A | 7/2007 | |
| JP | 2009-271766 A | 11/2009 | |
| JP | 2017-151541 A | 8/2017 | |
| JP | 2019-109768 A | 7/2019 | |
| JP | 6677516 B2 | 4/2020 | |
| JP | 2020-117068 A | 8/2020 | |
| JP | 2022-537798 A | 8/2022 | |
| WO | 2011/043006 A1 | 4/2011 | |
| WO | 2012/169052 A | 2/2015 | |

OTHER PUBLICATIONS

Co-pending U.S. Appl. No. 18/502,351, filed Nov. 6, 2023.
Co-pending U.S. Appl. No. 18/387,884, filed Nov. 8, 2023.
Co-pending U.S. Appl. No. 18/522,615, filed Nov. 29, 2023.
May 20, 2025 Office Action in Japanese Patent Application No. 2022-163188.
Jun. 17, 2025 Office Action in Japanese Patent Application No. 2022-198567.

* cited by examiner

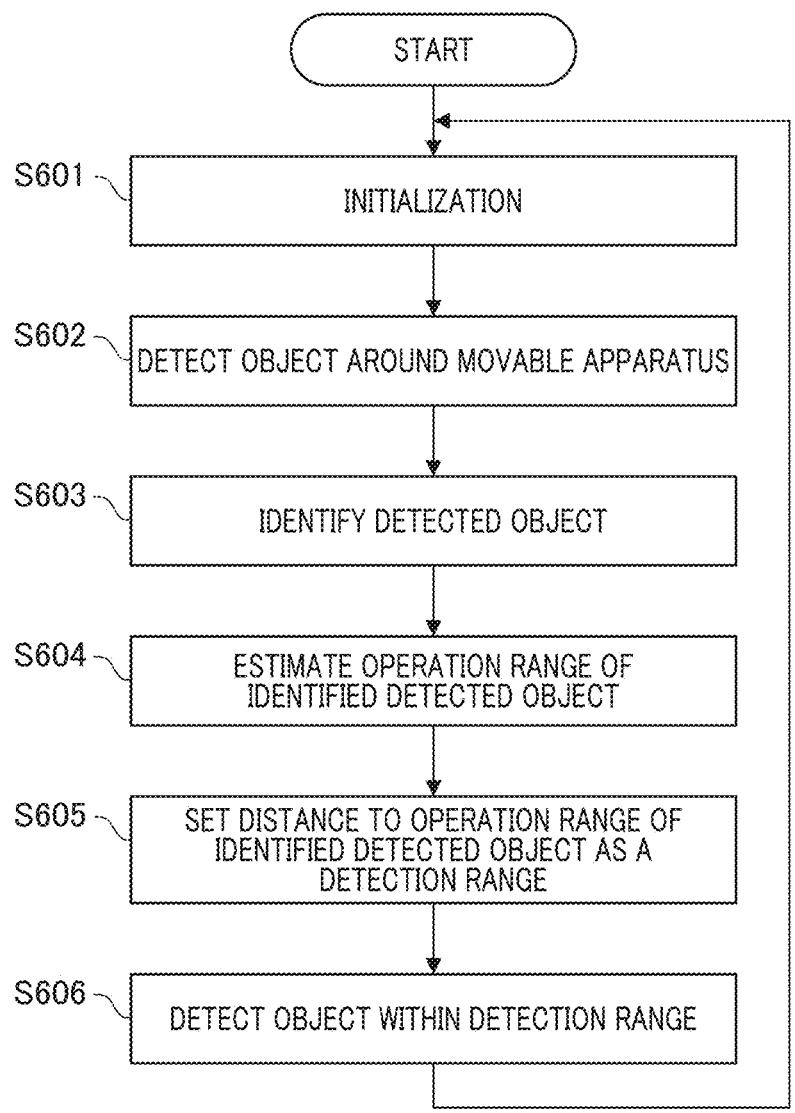

FIG. 11

| Obstacle attribute ID | Relative position | Relative speed |
|---|---|---|
| 1 | (x1, y1) | (vx1, vy1) |
| 2 | (x2, y2) | (vx2, vy2) |
| 3 | (x3, y3) | (vx3, vy3) |

FIG. 18

| Movable apparatus information ID | Shape | Braking performance |
|---|---|---|
| 1 | [(xp11, yp11), (xp12, yp12), (xp13, yp13), ...] | 0.2 |
| 2 | [(xp21, yp21), (xp22, yp22), (xp23, yp23), ...] | 0.15 |
| 3 | [(xp31, yp31), (xp32, yp32), (xp33, yp33), ...] | 0.3 |

INFORMATION PROCESSING APPARATUS, MOVABLE APPARATUS, INFORMATION PROCESSING METHOD, AND STORAGE MEDIUM

BACKGROUND OF THE INVENTION

Field of the Invention

The present invention relates to an information processing apparatus that detects an object around a movable apparatus, a movable apparatus, an information processing method, and a storage medium.

Description of the Related Art

Movable apparatuses such as an autonomous mobile robot detect an object that becomes an obstacle during traveling by using a sensor, for example, a camera, a laser scanner, and LiDAR (light detection and ranging), and, in a case in which the object is detected, the movable apparatus performs collision avoidance control such as detouring and stopping. As the detection range is widened, an object that is present around the movable apparatus can be detected earlier. However, the collision avoidance processing of the movable apparatus is performed every time detection is performed, and arrival at the destination may be delayed.

Japanese Patent No. 6677516 discloses a technology for determining the presence or absence of an object in the traveling direction of a movable apparatus and suppressing the detection of an object that does not hinder the traveling of the movable apparatus.

However, in the configuration of Japanese Patent No. 6677516, there is a case in which an obstacle that is present in a region where the obstacle does not actually pass is detected. As a result, there is a drawback in which a delay occurs in the arrival at the destination due to the collision avoidance processing of the movable apparatus, and the operation efficiency of the movable apparatus decreases.

SUMMARY OF THE INVENTION

An information processing apparatus comprising: at least one processor or circuit configured to function as: a passing region calculation unit configured to calculate a passing region through which a movable apparatus passes; an object detection unit configured to detect an object around the movable apparatus by a sensor; and an object detection range setting unit configured to set an object detection range in which the object is detected by the object detection unit based on the passing region calculated by the passing region calculation unit.

Further features of the present invention will become apparent from the following description of embodiments with reference to the attached drawings.

BRIEF DESCRIPTION OF THE DRAWINGS

FIG. 6 is an operation flowchart of the information processing apparatus according to the second embodiment.

FIG. 11 is a diagram illustrating an example of an obstacle attribute table 1100 that is used to manage the attributes of obstacles.

FIG. 18 is a diagram illustrating an example of a movable apparatus information table 1800 that is used for managing information related to a movable apparatus.

DESCRIPTION OF THE EMBODIMENTS

Figure 1:
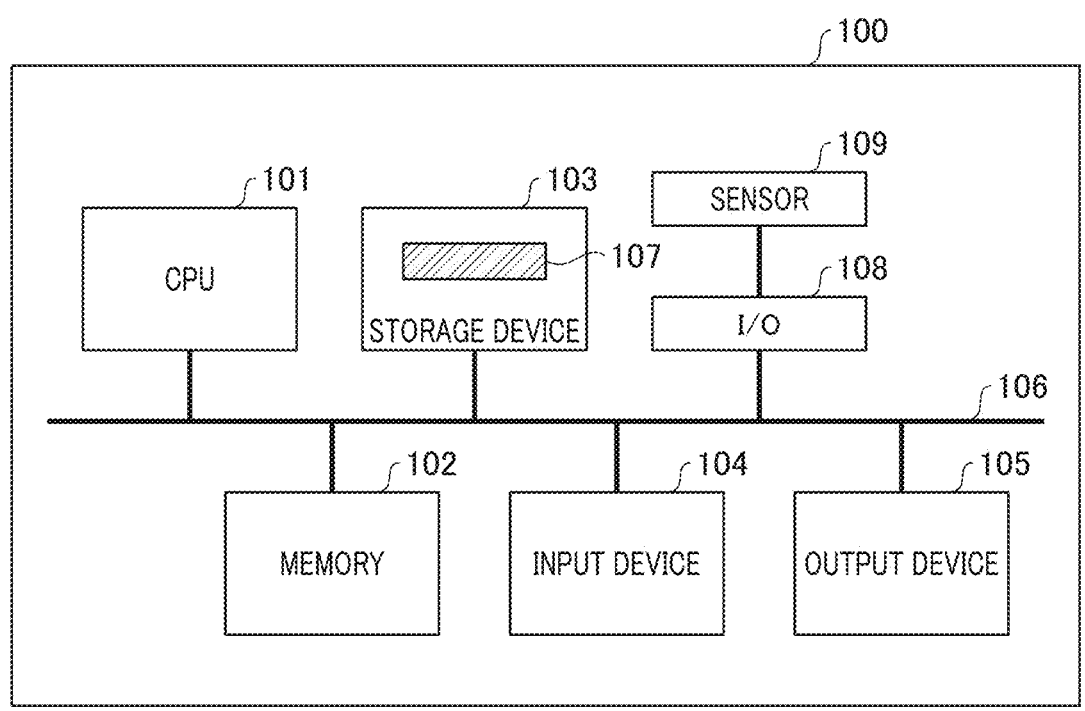
FIG. 1 is a diagram illustrating an internal configuration of an information processing apparatus according to the first embodiment.

Hereinafter, with reference to the accompanying drawings, favorable modes of the present invention will be described by using embodiments. In each diagram, the same reference signs are applied to the same members or elements, and duplicate description will be omitted or simplified.

Hereinafter, embodiments of the present invention will be explained with reference to the drawings. However, the present invention is not limited to the embodiments below. Note that, in each drawing, the same reference numerals are applied to the same members or elements, and duplicate description thereof will be omitted or simplified.

First Embodiment

As the first embodiment of an information processing apparatus according to the present invention, an information processing apparatus that changes a detection range of an obstacle detected by a sensor based on a region in which a movable apparatus travels will be described below as an example. Note that the movable apparatus in the present embodiment is an autonomous movable apparatuses including, for example, an Automated Guided Vehicle (AGV) and an Autonomous Mobile Robot (AMR). However, the movable apparatus is not limited to autonomous vehicles.

FIG. 1 is a diagram illustrating an internal configuration of an information processing apparatus according to the first embodiment. The information processing apparatus 100 includes a CPU 101 serving as a computer, a memory 102, a storage device 103, an input device 104, an output device 105, an I/O 108, and a sensor 109, which are connected to each other via a bus 106.

In the present embodiment, the sensor 109 is, for example, a passive stereo camera, and the presence or absence of an obstacle is detected based on the distance value of a feature point in a stereo image. By limiting this detection range to a region in which the movable apparatus travels, an object that is present in a region through which the movable apparatus does not actually pass is not detected. Thereby, the collision avoidance processing of the movable apparatus can be reduced, and the operation efficiency can be improved. Note that, in the description below, it is assumed that the size and route of the movable apparatus have been input to a storage device in the movable apparatus in advance.

The CPU 101 executes a program 107 that is stored in the storage device 103 to execute a program for calculating a region through which a movable apparatus passes and a program for controlling a range in which a sensor detects an object. The memory 102 temporarily stores programs and data that have been read from the storage device 103 by the CPU 101.

In addition, the memory 102 is also used as a region for the CPU 101 to execute various programs. The storage device 103 stores the results calculated by an operating system (OS) and the program 107, the route of the movable apparatus, and the size of the movable apparatus.

The input device 104 receives an input from a user by using a keyboard and a mouse. The output device 105 outputs information input by the input device 104 and an execution result of a program executed by the CPU 101. Reference numeral 108 denotes an I/O to which the sensor 109 for detecting an object is connected, and which acquires a detection signal from the sensor 109.

Figure 2:
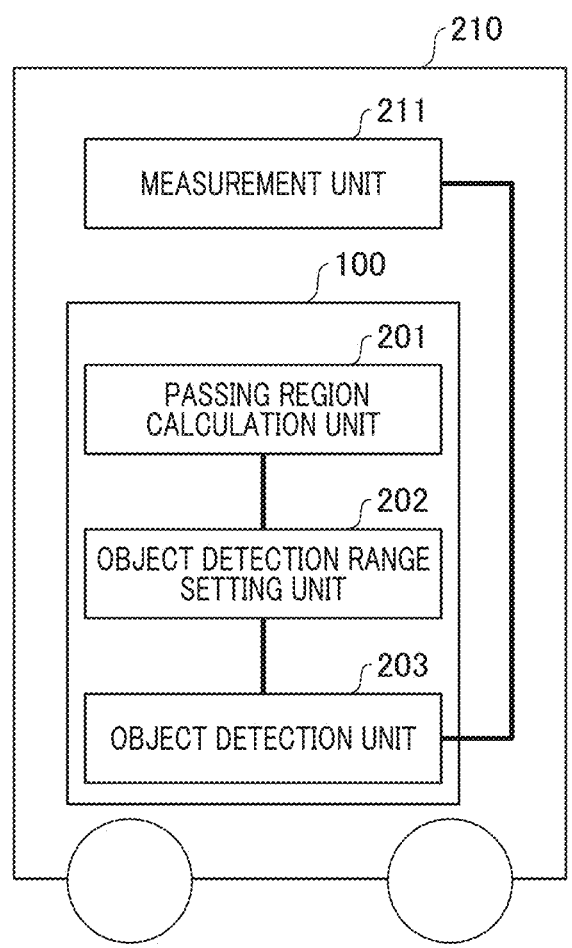
FIG. 2 is a functional block diagram of a movable apparatus that is equipped with an information processing apparatus 100 according to the first embodiment.

FIG. 2 is a functional block diagram of a movable apparatus equipped with the information processing apparatus 100 according to the first embodiment. Note that a part of the functional blocks as shown in FIG. 2 is realized by causing the CPU 101, which serves as a computer included in the information processing apparatus 100, to execute a computer program that is stored in the storage device 103 serving as a storage medium.

However, some or all of them may be realized by hardware. As the hardware, a dedicated circuit (ASIC), a processor (reconfigurable processor, DSP), and the like can be used.

Additionally, each of functional blocks of the information processing apparatus 100 as shown in FIG. 2 may not necessarily be incorporated in the same housing, and may be configured by separate devices that are connected to each other via a signal path. Note that the above explanation regarding FIG. 2 also applies to FIG. 5 to be described below.

A movable apparatus 210 includes the information processing apparatus 100 and a measurement unit 211, and the information processing apparatus 100 includes a passing region calculation unit 201, an object detection range setting unit 202, and an object detection unit 203. The measurement unit 211 calculates a distance to each feature point of the stereo image based on the information that has been input from the sensor 109, and outputs the distance to the object detection unit 203.

The passing region calculation unit 201 calculates a passing region through which the movable apparatus passes while traveling based on the size and the route of the movable apparatus. Note that the passing region includes a region through which a connected object that is connected to the movable apparatus and moves, or a cargo loaded on the movable apparatus pass. The object detection range setting unit 202 performs control such that an object detection range in which the object detection unit 203 detects an object is set based on the passing region that has been calculated by the passing region calculation unit 201.

Note that the object detection range setting unit 202 performs the setting so that at least a passing region that has been calculated by the passing region calculation unit 201 is included as the object detection range. The object detection unit 203 detects the presence or absence of an object based on the information that has been input from the measurement unit 211. That is, the object detection unit 203 detects an object around the movable apparatus 210 by using the sensor 109.

Figure 3:
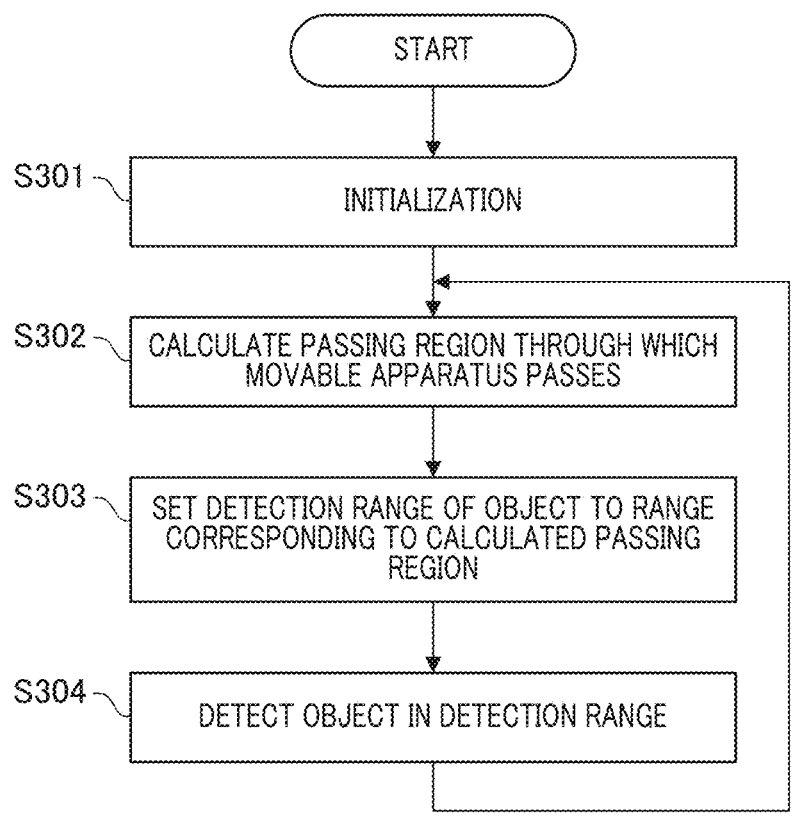
FIG. 3 is an operation flowchart of the information processing apparatus according to the first embodiment.
Figure 4:
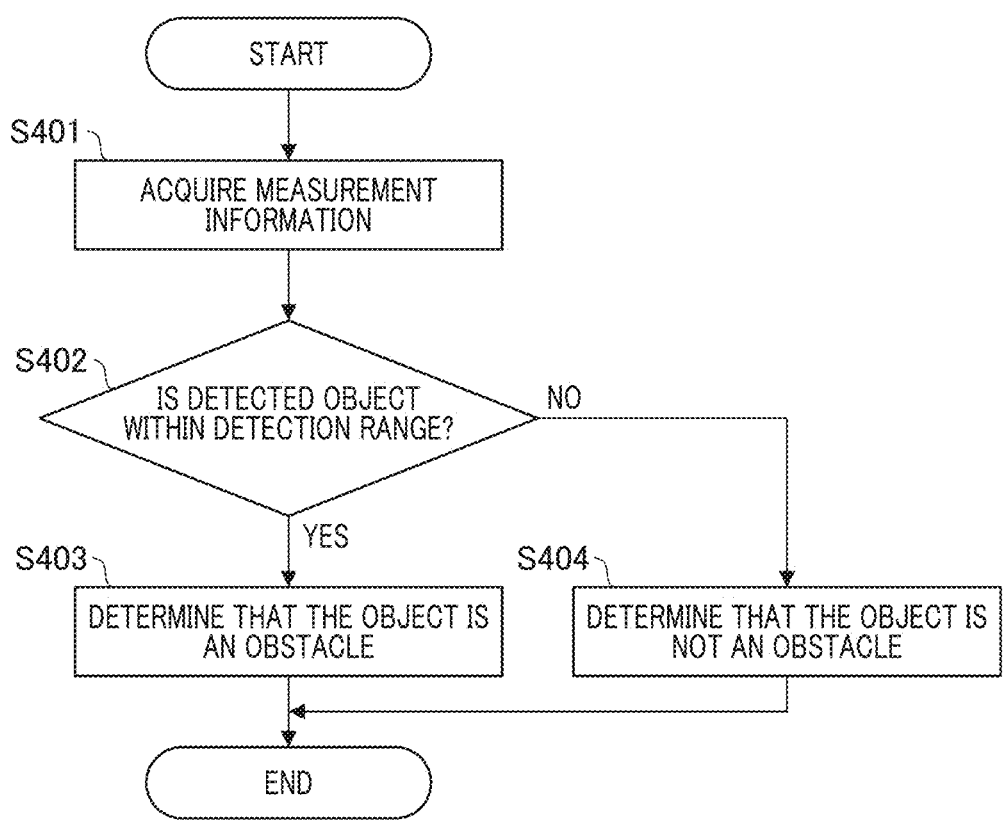
FIG. 4 is a flowchart that explains the details of step S304 in FIG. 3.

FIG. 3 is an operation flowchart of the information processing apparatus 100 according to the first embodiment, and FIG. 4 is a flowchart that explains the details of step S304 in FIG. 3. Note that the CPU 101 serving as a computer in the information processing apparatus 100 executes a computer program that is stored in the storage device 103, whereby the operation of each step in the flowchart of FIG. 3 and FIG. 4 is performed.

In step S301, as the initialization processing accompanying the execution of the processing, the size and route information of the movable apparatus 210 are loaded from the storage device 103 to the memory 102.

In step S302 (passing region calculation step), the passing region calculation unit 201 calculates a passing region (spatial region) through which the movable apparatus passes. The calculation method is based on the size and the route of the movable apparatus in the memory 102, and this is calculated as the spatial region through which the movable apparatus passes when the movable apparatus moves along the route.

In step S303 (object detection range setting step), in the object detection range setting unit 202, the range of object detection of the sensor 109 is set to a range corresponding to the passing region (spatial region) through which the movable apparatus passes and that was calculated in step S302. That is, the object detection range for detecting the object in step S302, which is the object detection step, is set based on the passing region calculated in step S304, which is the passing region calculation step.

In step S304 (object detection step), the object detection unit 203 detects an object in the region that has been set in step S303. That is, it is determined whether or not an object in the depth direction is included in the traveling region, for example, based on an image captured by setting a detection range, by detecting an object around the movable apparatus 210 by the sensor 109.

When step S304 ends, the process returns to step S302 again, and the operations of steps S302 to S304 are repeated until an end operation is detected by an end operation detection step (not illustrated).

The object detection step in step S304 will be explained with reference to the flowchart of FIG. 4. In step S401, measurement information of the detected object is acquired. In step S402, it is determined whether or not the measurement value up to the detected object is within the detection range set in step S303, and if the measurement value is within the range, the process proceeds to step S403, and the detected object is determined as an obstacle. Additionally, if the measurement value is outside of the range, the process proceeds to step S404, and it is determined that the detected object is not an obstacle.

Note that the determination result as to whether or not the object is an obstacle may be displayed or notified to the user by character data, sound, or light by using, for example, a display unit. Alternatively, deceleration, avoidance or stopping to prevent the movable apparatus from colliding with the detected object may be driven and controlled by a driving unit (not illustrated) of the movable apparatus, based on the determination result.

As explained above, according to the information processing apparatus 100 of the first embodiment, the passing region of the movable apparatus is set as the detection range of the object. Therefore, even when the object outside the passing region of the movable apparatus is detected, the object is not recognized as an obstacle, and thus, it is possible to reduce unnecessary avoidance operations and the like and improve the efficiency of the operation of the movable apparatus.

Note that, although, in the above explanation, an example in which a passive stereo camera is used as a sensor has been described, any type of sensor may be used as long as the sensor can detect the position of an object and the distance to the object. For example, an active stereo camera, a TOF (Time-Of-Flight) camera, and a LiDAR sensor may be used.

Additionally, although, in the first embodiment, an example in which the detection range of the sensor is set as the region through which the movable apparatus passes has been described, the range that is the detection range of the first embodiment and the range at least up to a distance (stopping distance) at which the movable apparatus can stop may be set as the detection range.

For example, a braking distance is calculated based on the current speed, acceleration, and the like of the movable apparatus, a region through which the movable apparatus passes in a range from the current point to the braking distance or the stopping distance is set as a passing region, and the region is set as a detection range, and as a result, it is possible to further suppress the detection of an object that does not hinder the traveling of the movable apparatus. Note that it is assumed here that the stopping distance is an idle running distance (a travel distance during the delay before the user steps on the brakes or during program processing time)+a braking distance (a running distance after the brake is applied).

Although, in the above explanation, an example in which the detection range is set based on the passing region of the movable apparatus has been described, a region only up to a braking distance, without using the passing region of the movable apparatus, may be calculated in step S302, and the region may be set as the detection range.

Although, in the first embodiment, an example in which the traveling region including the route of the movable apparatus is set as the detection range of the sensor has been described, this traveling region may be a region including, in addition to the route, a deviation (error) and the like that is generated when the movable apparatus travels on the route. Although the movable apparatus travels along the route, there are cases in which the movable apparatus cannot travel the route accurately depending on the environment and the traveling condition of the movable apparatus.

For example, one wheel of the movable apparatus may slip to wobble, a plurality of wheels of the movable apparatus may slip to cause a skid, or an inner wheel difference or an outer wheel difference of the wheels may occur when the movable apparatus turns, depending on a friction coefficient between a road surface and a wheel of the movable apparatus, and thus, the movable apparatus may deviate from its assumed route. Additionally, there are cases in which a movable apparatus carrying a tall load deviates from the route due to the crosswind.

In the case in which the movable apparatus wobbles or skids, a difference between an acceleration, an inertia force, and a direction assumed when the movable apparatus travels on the route and those values when the movable apparatus actually travels is calculated, and the passing region is determined by including the difference in the size of the movable apparatus. Additionally, when the road surface is wet or slippery, the passing region is calculated by taking into account the road surface. When the vehicle is blown by the crosswinds, the passing region is calculated by taking into account the moving amount required for returning to the original route.

Additionally, for the inner wheel difference and the outer wheel difference, the passing region is calculated based on the route of the movable apparatus, the positions of the wheels of the movable apparatus, and the turning angle. Alternatively, the passing region may be calculated by performing expansion processing on a region having the size of the movable apparatus and adding a margin having a given size.

Alternatively, in a case in which a location where a car wobble or a skid occurs is known, the passing region may be calculated by adding a margin to only a portion of the route. That is, the passing region calculation unit 201 may calculate the passing region based on the braking performance of the movable apparatus 210, the speed during traveling, the route, and the like.

Alternatively, the detection range in the first embodiment may be set based on only the distance. That is, only a predetermined distance range may be set as the detection range. In this case, the detection range is set by changing parameters related to distance measurement of the sensor. Specifically, in the case of a passive stereo camera, parallax and the like during stereo matching is limited. Additionally, in the case of a sensor that measures a distance image and a LiDAR, the detection range can be defined based on a measured distance value.

Alternatively, the detection range in the first embodiment may be set only in the range in the horizontal and vertical directions without taking into consideration the distance. Specifically, with respect to the region of the image that has been captured as the stereo image, the detection range can be limited as parameters to the position through which the movable apparatus passes and the range in the vertical and horizontal directions.

As described above, the object detection range setting unit 202 sets the object detection range by changing the parameter so that the object detection range includes the passing region that has been calculated by the passing region calculation unit 201. The above parameter includes at least one of the parameters such as the parallax in the sensor 109 and the parameters related to the detection range in the object detection.

Second Embodiment

In the first embodiment, a detection range is set to a range corresponding to the spatial region through which the movable apparatus passes. In contrast, in the second embodiment, a type by which an object around a movable apparatus can at least be a movable apparatus or not is determined, and a detection range of an obstacle by a sensor is changed based on a region occupied by the object in a space. Note that, in the present embodiment, the sensor detects an object in front of the movable apparatus by using a passive stereo camera, and performs image recognition on the object obtained from the sensor to identify the object.

Specifically, the object is identified by performing matching between the captured image and a template image of the object stored in advance, and based on the result of identification, a detection range so that an object in which the possibility of moving to the vicinity of the movable apparatus is low is not detected as an obstacle is set. According to this method, an object for which the possibility of the detected object colliding with the movable apparatus is low is excluded from the detection target, so that the collision avoidance processing of the movable apparatus can be reduced, and the operation efficiency can be improved.

The hardware configuration of the information processing apparatus according to the second embodiment is substantially the same as that in FIG. 1, except for the configuration of the sensor 109. Note that the image for template matching and the moving range of the object in the image are input to the storage device 103.

The program 107 that is stored in the storage device 103 includes a program for controlling a range in which the sensor detects an object and a program for identifying a detected object by the template matching. Additionally, the sensor 109 is configured by a first sensor 109a and a second sensor 109b, and the first sensor 109a and the second sensor 109b are connected to the V/O 108.

Figure 5:
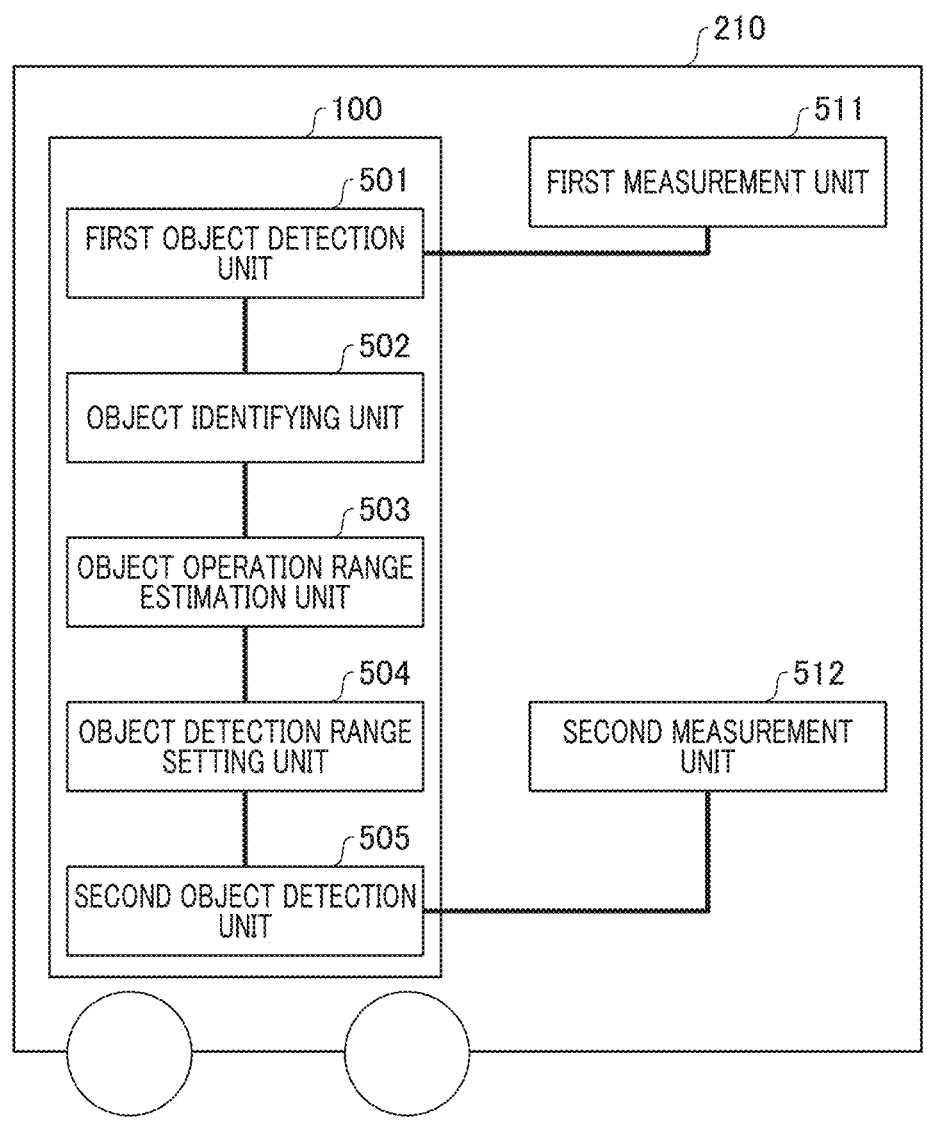
FIG. 5 is a functional block diagram of the information processing apparatus according to the second embodiment.

FIG. 5 is a functional block diagram of the information processing apparatus 100 according to the second embodiment. The movable apparatus 210 includes the information processing apparatus 100, a first measurement unit 511, and a second measurement unit 512. The information processing apparatus 100 includes a first object detection unit 501, an object identification unit 502, an object operation range estimation unit 503, an object detection range setting unit 504, and a second object detection unit 505.

The first measurement unit 511 calculates distances to each of feature points of the stereo image based on the information that has been input from the first sensor 109a, and outputs the distances to the first object detection unit 501. The second measurement unit 512 calculates the distances to each of the feature points of the stereo image based on the information that has been input from the first sensor 109b, and outputs the distances to the second object detection unit 505.

The first object detection unit 501 outputs the presence or absence of an object and the distance to the object based on the information that has been input from the first measurement unit 511. That is, an object around the movable apparatus is detected by the first sensor 901a. The object identification unit 502 identifies an object based on features such as a type, an attribute, and a size of the object that have been detected by the first object detection unit 501. The object operation range estimation unit 503 estimates an operation range (moving range) of the object that has been identified by the object identification unit 502.

The object detection range setting unit 504 sets (controls) the object detection range in which the second object detection unit 505 detects the object based on (the position of) the object that has been identified by the second object identification unit 502 and the operation range of the object that has been estimated by the object operation range estimation unit 503. The second object detection unit 505 detects the presence or absence of the object based on the information that has been input from the second measurement unit 512. That is, the object around the movable apparatus is detected by the second sensor 901b.

FIG. 6 is an operation flowchart of the information processing apparatus 100 according to the second embodiment. Note that the CPU 101 serving as a computer in the information processing apparatus 100 executes a computer program that is stored in the storage device 103, whereby the operation of each step in the flowchart of FIG. 6 is performed.

In step S601, as initialization processing that accompanies the execution processing, route information, an image for template matching, and supplementary information of the image are loaded from the storage device 103 into the memory 102. In step S602, the first object detection unit 501 detects an object around the movable apparatus.

That is, in step S602 (first object detection step), the first sensor detects an object around the movable apparatus similar to the first embodiment, in the detection method, an object is detected by performing stereo matching on the feature points of an image that has been captured by a passive stereo camera of the sensor 109a.

In step S603, whether or not the object that has been detected by the object identification unit 502 is a movable apparatus is identified. That is, in step S603 (object identification step), the object is identified based on the feature of the object that has been detected in step S602, which is the first object detection step. In the identifying method, the detected object is identified by performing matching between the image when the object is detected in step S602 and the template image of an object having supplementary information of an operation range that has been registered in advance.

In step S604 (object operation range estimation step), the operation range of the object identified in step S603, which is the object identification step, is estimated. The operating range is estimated based on the information on the operating range or the presence or absence of moving that is associated with the matched image. Additionally, even if objects that can be detected, objects for which the type or movement cannot be identified are treated as objects that move throughout the entire region.

In step S605, if the identified object and the operation range thereof have a low possibility of moving to the vicinity of the movable apparatus, the object is excluded from being detected as an obstacle. To prevent the operating range of the object from being included in the detection range of the sensor, the nearest distance from the movable apparatus to the identified object within the detection range of the sensor is set as the detection range of the second sensor 109b.

That is, in step S605 (object detection range setting step), the object detection range when the object is detected in step S606 is set based on the object that has been identified in step 603 and the operation range that has been estimated in step 604.

At this time, the object detection range setting unit 504 sets the object detection range based on, for example, the positional relation between the object that has been identified by the object identification unit 502 and the movable apparatus. Additionally, at this time, the object detection range setting unit 504 sets the detection range by changing parameters of the sensor or changing the object detection processing parameters, as described in the first embodiment.

In step S606, a second sensor 901b is used to detect whether or not an object is present in the detection range that has been set in step S605. That is, in step S606 (second object detection step), the second sensor detects an object around the movable apparatus 210. When it is detected that the object is present, the processing of determining that the object is an obstacle is repeated until an end operation is detected by an end operation detection step (not illustrated).

As described above, an object that is unlikely to come near the movable apparatus is detected first so that the object is excluded from being detected as an obstacle. Then, whether or not another obstacle is present between the object and the movable apparatus can be confirmed. For example, assume that a wall is detected in the operation range. In the case in which the movable apparatus comes close to the wall and then takes a route to travel along the wall, even if the wall is detected, the wall is excluded from being detected as an obstacle. Therefore, the movable apparatus can continue to travel without stopping.

As explained above, in the information processing apparatus 100 according to the second embodiment, it is possible to improve the efficiency of the running of the movable apparatus by detecting an object that is unlikely to come near the movable apparatus first and setting the detection range so that the object is not detected as an obstacle.

Although, in the second embodiment, an example in which a plurality of sensors and object detection units are used has been described, one sensor and one object detection unit may be used. Specifically, detection for recognizing an object and detection for recognizing an object other than the recognized object may be alternately performed such that, after all objects are detected by the first sensor and an object is identified from among the objects, the distance to the identified object is reset to the detection range, and the object is detected.

In addition, although, in the second embodiment, an example of determining what the object is by performing matching of similar images has been described, the determination method is not limited thereto. For example, the object may be recognized from the image by using a machine learning technique, for example, deep learning.

In addition, although, in the second embodiment, an example in which an object is identified and an object whose movement range overlaps with the detection range is detected has been described, an object that is recognized not to collide may be excluded from the detection target irrespective of the movement range of the identified object. For example, in an environment in which a plurality of movable apparatuses is operating, when one movable apparatus follows another movable apparatus, the following movable apparatus always includes a preceding (leading) movable apparatus in the detection range of the sensor.

Normally, a following movable apparatus detects a leading movable apparatus and takes an avoidance action. In the specific processing, to determine whether or not the detected object is a movable apparatus in step S603 in FIG. 6, for example, identification is performed by identification objects such as a two-dimensional barcode that is provided on the movable apparatus or object recognition such as deep learning.

In addition, in the case in which the detected object is a movable apparatus, it is confirmed in step S604 whether or not the route of the identified movable apparatus and the route of one's movable apparatus intersect at the same timing, or travel in the same direction. When it is determined that the routes do not intersect, that is, it is determined that the potential for a collision would not normally occur, the leading movable apparatus is excluded from being detected as an obstacle. Alternatively, a section of the leading movable apparatus traveling in the same direction is grasped based on the route information, and during travelling in the section, the leading movable apparatus is excluded from being detected as an obstacle.

Note that, also in the second embodiment, the control of the movable apparatus by an external terminal and the like may be urged, for example, by reporting the detection result (presence or absence of an obstacle and the like) in step S606 to the external terminal and the like by using data like a message, sound, light and the like. Alternatively, reducing speed, avoiding, or stopping may be performed by controlling the movable apparatus to prevent the movable apparatus from colliding with the detected object based on the detection result in step S606. Additionally, when the detection range becomes shorter than the braking distance, control of the movable apparatus may be performed such that the detection range becomes the braking distance.

Although, in the second embodiment, the detection region is determined based on one detection result, an object that has been determined to be an object that is high possibility of being present in a fixed manner based on the object detection history at the same point in the past may be excluded from the detection region of the second object detection unit 405.

Specifically, the object, the image thereof, and the position of the object are stored in step S603 of FIG. 5. Then, a branch is provided before step S604, and it is determined in this branch whether or not the detected object has been detected in the past.

In the determination processing, template matching is performed on whether an object has been detected at the same position in the past or whether the detected object is the same as the one detected now, and if all match, the object is determined to be the same as the one detected in the past. When it is determined that the object is the same as the one detected in the past, the object is treated as an immovable object, and the process proceeds to step S605. If no match is found, the object is determined to be a different object, and, in step S604, the operation range is estimated.

Although, in the second embodiment, an example is shown in which template matching is performed to identify an object detected due to a movable apparatus traveling, if it can be determined that the object is an immovable object even if identification is not performed, the object may be excluded from the detection region of the second object detection unit 405.

Specifically, drawing data or CG data of a region in which the movable apparatus travels is stored in advance, which is used as information indicating that the object is determined to be an immovable object. Fixed objects such as a wall and a column are shown in this drawing data, and the position and the direction in which the movable apparatus travels in the drawing data may be grasped by associating the drawing data with the position and the orientation in which the movable apparatus travels.

Although, in the second embodiment, an example in which the detected object is identified and the detection range is set based on the position of the object has been described, a region that the detected object may occupy in the space may be further estimated, and the detection range may be set based on the region.

Specifically, in the case in which the template matching is performed to identify the detected object in step S603, the ranges matched on the same template image is determined to be the same object, and thereby, that the occupied region of the object can be estimated. Subsequently, the operation range of the object with respect to the occupied region may be estimated, and the object may be detected depending on whether the operation range is included in the detection range.

Third Embodiment

Although, in the first embodiment and the second embodiment, the object detection range determined in each of the first embodiment and the second embodiment is controlled, in the third embodiment, the first embodiment and the second embodiment are switched based on the speed of the movable apparatus that is travelling. In the internal configuration and the functional block diagram of the information processing apparatus according to the third embodiment, the configurations and the functions of the first embodiment and the second embodiment are used. Further, a determination unit is provided to determine which function is to be used.

In the flowchart of the information processing apparatus 100 according to the third embodiment, although the flows of the first embodiment and the second embodiment are used, a branch for determining which process is to be performed before entering each flow is provided in the preceding stage. This branch is determined by the above-described determination unit, and when the movable apparatus is traveling at a speed at which the braking distance of the movable apparatus is equal to or less than a threshold, the detection range by the sensor is controlled based on the region in which the movable apparatus is traveling by the processing of the first embodiment. In contrast, when the movable apparatus travels at a speed higher than the threshold, the detection range by the sensor is changed based on the identification result of the object around the movable apparatus by the processing of the second embodiment.

Fourth Embodiment

Although, in the third embodiment, an example of switching between the first embodiment and the second embodiment has been described, in the fourth embodiment, these first embodiment and second embodiment are used in combination. The internal configuration of the information processing apparatus according to the third embodiment is the same as that in the second embodiment, and in the functional block diagram, a passing region calculation unit of the first embodiment is added to the second embodiment.

In the processing step, a type and an attribute of the object that has been detected within a detection range of a sensor according to the second embodiment is identified, and an operation range of the detected object is estimated. Then, a passing region of the movable apparatus according to the first embodiment is calculated, and a detection range is set so as to detect an object that is present in the passing region and an object whose estimated operation range overlaps with the passing region.

Fifth Embodiment

Although, in the first embodiment, the second embodiment, the third embodiment, and the fourth embodiment, an example in which the detection range is controlled has been described, in the fifth embodiment, presentation to the user is performed by the display device based on the detection result and the obstacle determination result. The example will be explained with reference to FIG. 7.

Figure 7A:
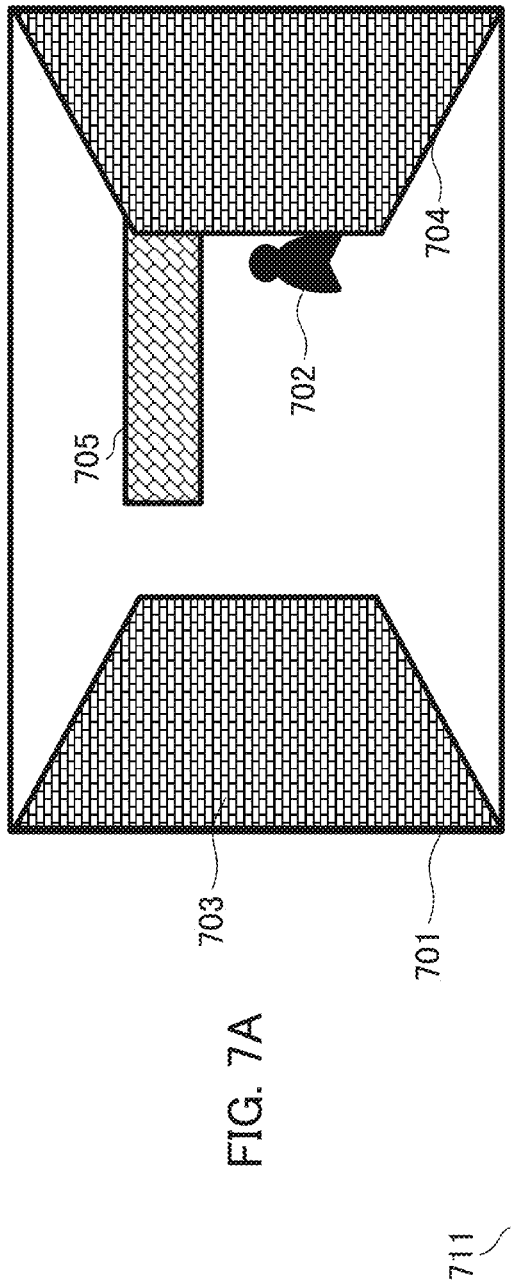
FIGS. 7A and 7B are diagrams illustrating a display example according to the fifth embodiment.
Figure 7B:
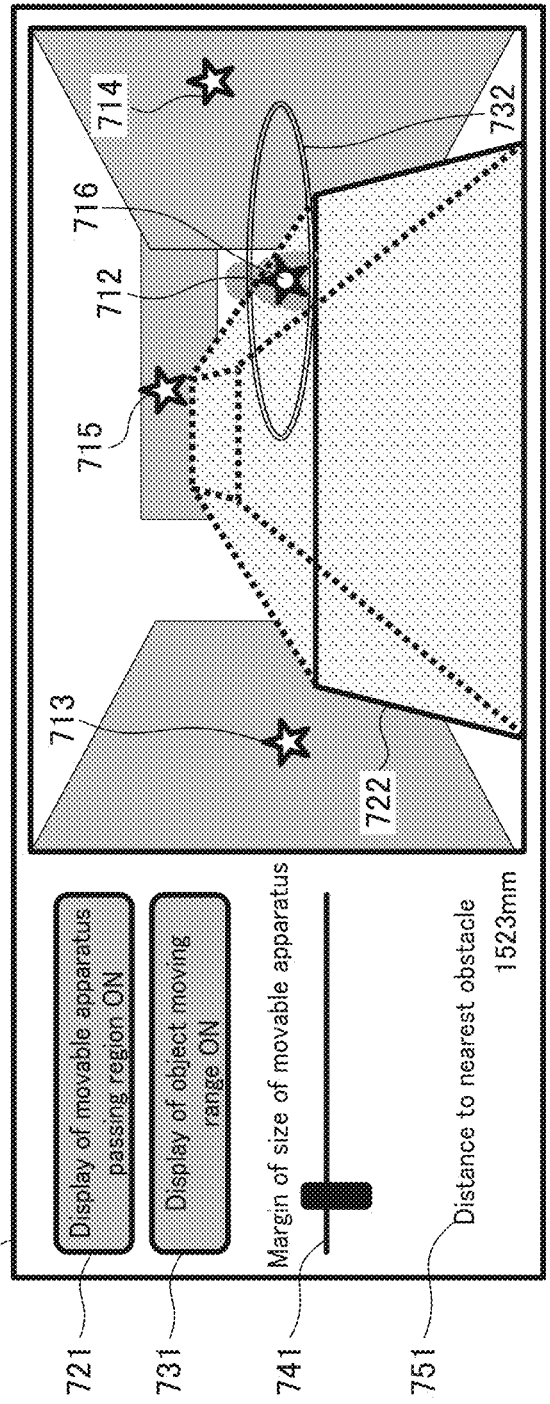

FIGS. 7A and 7B are diagrams illustrating display examples according to the fifth embodiment. FIG. 7A illustrates an image 701 when captured by a passive stereo camera, in which a person 702, a wall 703, a wall 704, and a wall 705 are reflected. FIG. 7B is a diagram illustrating a UI screen 711 indicating a result of an object that has been detected based on the image as shown in FIG. 7A and a display of an obstacle detection region, and various confirmations and display settings can be performed on the UI screen 711.

Reference numerals 712, 713, 714, and 715 represent marks indicating the types of the detected objects, and are displayed to be distinguished depending on whether or not the detected objects are movable apparatuses. That is, a movable apparatus is represented by the mark 712, immovable objects are represented by the marks 713 to 715. Furthermore, the closest movable apparatus is represented by the mark 716, and the distance to the movable apparatus is represented by a distance value 751.

A detection range 722 is obtained by visualizing the detection range, and an object included in the detection range 722 is set to be an obstacle detection target. Although there is the wall 705 at the back of the detection range 722, when the wall 705 is identified, the wall 705 is identified as an immovable object, and thus the wall 705 is not included in the detection range 722.

The UI screen 711 further has a button 721 for switching between ON and OFF of the display of the movable apparatus passing region, and a button 731 for switching between ON and OFF of the display of the operation range of the detected object. Additionally, the UI screen 711 has a sliding bar 741 for setting a margin of the size of the movable apparatus to absorb a deviation when the movable apparatus moves.

When the button 721 for switching between ON and OFF of the display of the movable apparatus passing region is switched to ON, the detection range 722 is displayed to display the passing region of the movable apparatus. When the button 731 for switching between ON and OFF of the display of the operation range of the detected object is switched to ON, the range in which the detected object moves is displayed. The person 702 is identified as a movable apparatus, and the operation range thereof is represented by a range 732.

Although, in the example of FIG. 7B, the position of the person 702 is not included in the passing region of the movable apparatus, the operation range 732 is included in the passing region, and thus, the person 702 is determined to be an obstacle and can be confirmed on the display. Additionally, the size of the movable apparatus is expanded or contracted by the set value by changing the margin setting of the size of the movable apparatus by using the sliding bar 741, and the detection range 722 is displayed based on the size.

Sixth Embodiment

In the information processing apparatus according to the sixth embodiment, the attribute of the obstacle that is present in the vicinity of the movable apparatus is acquired, and obstacle detection parameters are adjusted based on the acquired attribute of the obstacle.

Figure 8:
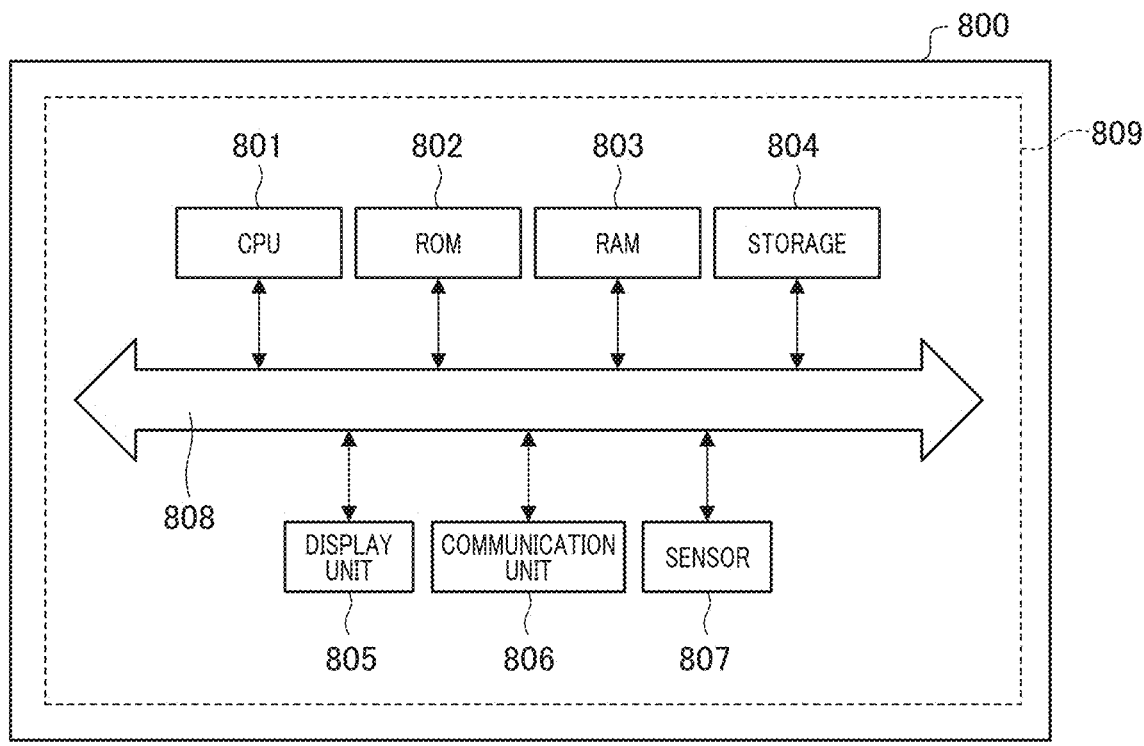
FIG. 8 is a diagram illustrating an example of a hardware configuration of the information processing apparatus according to the sixth embodiment.

FIG. 8 is a diagram illustrating a hardware configuration example of the information processing apparatus according to the sixth embodiment. The information processing apparatus 800 has a CPU 801 serving as computer, a ROM 802, and a RAM 803, a storage 804, the display unit 805, a communication unit 806, and a sensor 807. Additionally, the components are connected to each other via a system bus 808.

The CPU 801 is a central processing unit (CPU) that performs calculation, logical determination, and the like for various processing, and controls each of the components that are connected to the system bus 808. The ROM (Read-Only Memory) 802 is a program memory that stores a computer program for control performed by the CPU 801 including various processing procedures executed in the information processing apparatus 800.

The RAM (Random Access Memory) 803 is used as the main memory of the CPU 801 and temporary storage areas such as work areas. Note that the program may be loaded into the RAM 803 from an external storage device and the like that are connected to the information processing apparatus 800.

The storage 804 is an auxiliary storage device for storing electronic data and programs according to the present embodiment, which can be a hard disk drive and a solid state drive.

Note that an external storage device may be used as a device that plays a similar role. Here, the external storage device is configured by, for example, a recording medium and an external storage drive that accesses the recording medium for writing and reading.

Such a recording medium includes, for example, a CD-ROM, a DVD, a BD, a USB memory, an MO, and a flash memory. Note that the external storage device may be a server device and the like that are connected via a network.

The display unit 805 is, for example, a CRT display, a liquid crystal display, and the like, and is a device that outputs information to a display screen. Note that the display unit 805 may be an external device that are connected to the information processing apparatus 800 in a wired or wireless manner. The communication unit 806 performs bidirectional communication with another information processing apparatus, a communication device, an external storage device, and the like in a wired or wireless manner.

The sensor 807 is a device that acquires an attribute of an obstacle that is present around a movable apparatus 809 and detects the obstacle. The sensor 807 may be configured by a plurality of types of devices. The sensor 807 may be, for example, a LiDAR and a Doppler radar.

The LiDAR acquires a relative position of an obstacle to the movable apparatus 809, and the Doppler radar acquires a relative speed of the obstacle to the movable apparatus 809. Additionally, a device used for detecting obstacles may be, for example, a passive stereo camera. The passive stereo camera detects the presence or absence of an obstacle based on distance values of feature points in a stereo image. As described above, in the present embodiment, an obstacle attribute acquisition unit 902 acquires an attribute of the obstacle by using a sensor that is provided in the movable apparatus 809.

Although, in the present embodiment, the movable apparatus 809 is an Automated Guided Vehicle (AGV) and the like on which the information processing apparatus 800 is mounted, the movable apparatus 809 is not limited to the AGV and the like. Additionally, a part of the information processing apparatus 800 may be disposed outside the movable apparatus 809.

Figure 9:
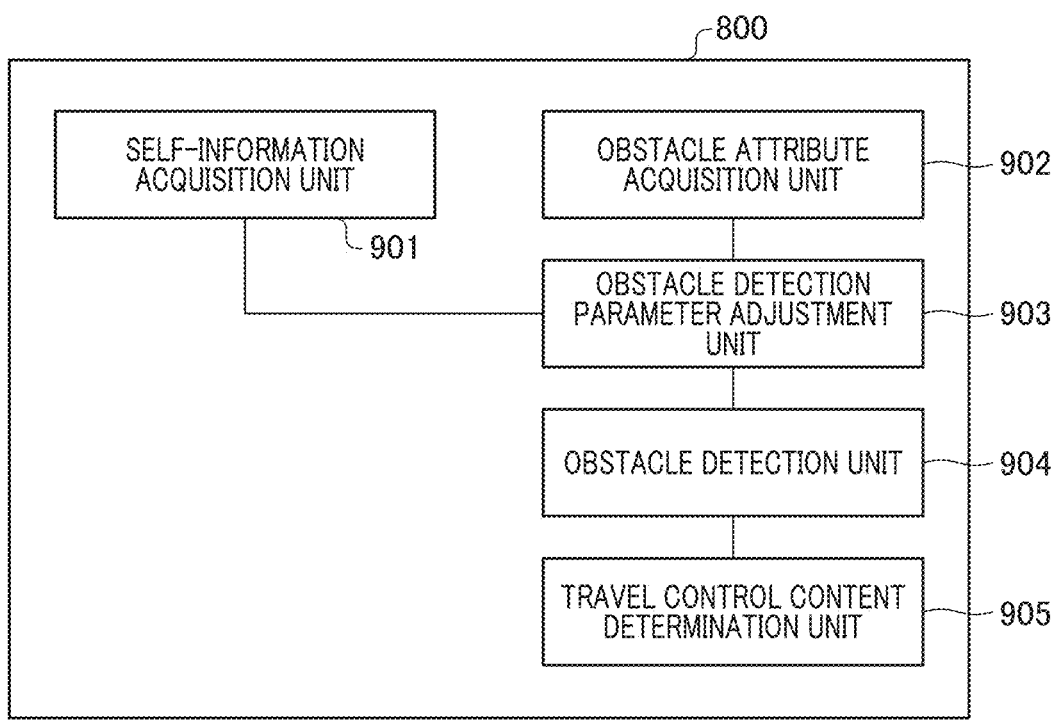
FIG. 9 is a functional block diagram showing a functional configuration of an information processing apparatus 800 according to the sixth embodiment.

FIG. 9 is a functional block diagram illustrating a functional configuration of the information processing apparatus 800 according to the sixth embodiment. Note that some of the functional blocks as shown in FIG. 9 are realized by causing the CPU 801, which serves as a computer included in the information processing apparatus 800, to execute a computer program stored in a memory serving as a storing medium.

However, some or all of them may be realized by hardware. As the hardware, a dedicated circuit (ASIC), a processor (reconfigurable processor, DSP), and the like can be used.

Additionally, the each of the functional blocks as shown in FIG. 9 may not necessarily be incorporated in the same housing, and may be configured by separate devices that are connected to each other via a signal path. Note that the above explanation regarding FIG. 9 also applies to FIG. 16.

The self-information acquisition unit 901 acquires information about the movable apparatus 809, such as a position, a speed, a shape, and a braking performance of the movable apparatus 809. Here, the self-information acquisition unit 901 acquires information on the movable apparatus 809. Note that the position of the movable apparatus 809 can be acquired by using Simultaneous Localization and Mapping (SLAM) for data obtained from the sensor 807.

Note that, in a case in which LiDAR is used as the sensor 807, LiDAR SLAM may be used. Additionally, in a case in which a passive stereo camera is used, Visual SLAM may be used. The speed can be calculated based on the displacement between frames of the position obtained by SLAM. Static information regarding the movable apparatus 809, such as the shape and the braking performance, is acquired by reading out information that has been stored in the storage 804 in advance.

The obstacle attribute acquisition unit 902 acquires attributes of obstacles that are present around the movable apparatus 809 by using the sensor 807, and stores the attributes in the obstacle attribute table 1100 to be described below. In the present embodiment, a relative position of the obstacle with respect to the movable apparatus and a relative speed of the obstacle with respect to the movable apparatus will be described in examples as the attribute of the obstacle. Here, the obstacle attribute acquisition unit 902 acquires the attributes of obstacles that are present around the movable apparatus.

An obstacle detection parameter adjustment unit 903 adjusts a parameter related to obstacle detection of an obstacle detection unit 904, which will be described below, based on the attribute of the obstacle that has been acquired by the obstacle attribute acquisition unit 902.

The obstacle detection unit 904 performs obstacle detection by using the sensor 807. In the present embodiment, a method using an obstacle detection map indicating a region in which an obstacle is to be detected will be described as an example of the obstacle detection method. Additionally, in the obstacle detection using the obstacle detection map, the shape of the obstacle detection map is an example of the obstacle detection parameter.

At this time, the obstacle detection unit 904 refers to the obstacle detection parameter that has been adjusted by the obstacle detection parameter adjustment unit 903. The methods for detecting obstacles include a method in which an obstacle is detected when an obstacle enters the obstacle detection map and a method in which an obstacle is detected when an area occupied by the obstacle in the obstacle detection map is equal to or greater than a threshold. Here, the obstacle detection unit 904 detects an obstacle based on the parameters that have been adjusted by the obstacle detection parameter adjustment unit 903.

When the obstacle detection unit 904 detects an obstacle, a travel control content determination unit 905 determines the travel control content of the movable apparatus 809 based on the attributes (position, speed, and the like) of the obstacle. Examples of the travel control content include one or more of stopping the movable apparatus 809, decelerating the movable apparatus 809, causing the movable apparatus 809 to avoid the obstacle, and the like. Here, the travel control content determination unit 905 functions as a movement control unit that determines the control content of the movable apparatus 809 based on the attribute (position, speed, and the like) of the obstacle and performs movement control.

When the obstacle is detected, a predetermined travel control content may be simply adopted, or a travel control content may be determined based on the attribute of the detected obstacle. For example, whether to stop or decelerate the movable apparatus 809 (or the deceleration amount at that time) may be determined based on the relative distance between the movable apparatus 809 and the obstacle.

Additionally, the avoidance direction of the movable apparatus 809 may be obtained from the speed (vector) of the movable apparatus 809 that has been acquired by the self-information acquisition unit 901 and the relative position between the movable apparatus 809 and the obstacle, and the travel control content such that the obstacle is avoided may be determined.

The travel control content determination unit 905 displays the information on the movable apparatus 809 that has been acquired by the self-information acquisition unit 901 and the attribute of the obstacle that has been acquired by the obstacle attribute acquisition unit 902 on the display unit 805. In addition, the travel control content decision unit 905 may also display the obstacle detection parameter that has been adjusted by the obstacle detection parameter adjustment unit 903 and the travel control content that has been determined by the travel control content decision unit 905. Furthermore, statistical information such as a processing frequency and a processing time in each of functional units such as the obstacle detection parameter adjustment unit 903 may be displayed.

Figure 10:
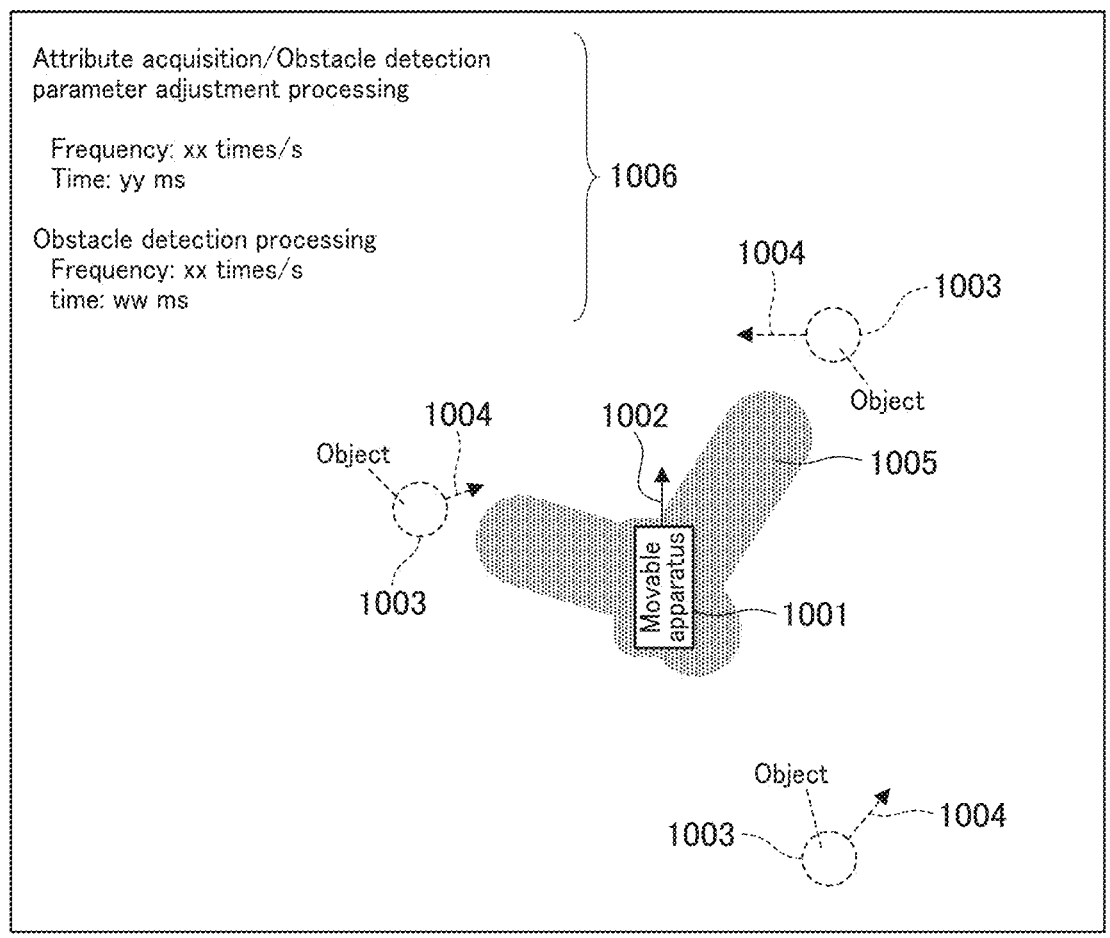
FIG. 10 is an image diagram of a screen displayed on a display unit 805 according to the sixth embodiment.

FIG. 10 is an image diagram of a screen displayed on the display unit 805 according to the sixth embodiment. Reference numeral 1001 denotes an icon representing the position and the shape of the movable apparatus 809. Reference numeral 1002 denotes an arrow representing the traveling direction and the speed of the movable apparatus 809. The orientation of the arrow indicates the traveling direction, and the length indicates the speed. Reference numeral 1003 denotes an icon representing the position of the obstacle.

Reference numeral 1004 denotes an arrow representing a relative traveling direction and a relative speed of the obstacle to the movable apparatus 809. The orientation of the arrow indicates the relative traveling direction, and the length of the arrow indicates the relative speed. Reference numeral 1005 denotes an obstacle detection map. Reference numeral 1006 denotes statistical information related to the processing of each of the functional units.

In the example of FIG. 10, the frequency of the processing of acquiring the attribute of the obstacle and the processing of adjusting the obstacle detection parameter and the time required for the processing are displayed. Additionally, the frequency of obstacle detection processing and the time required for the processing are also displayed together.

Figure 11:
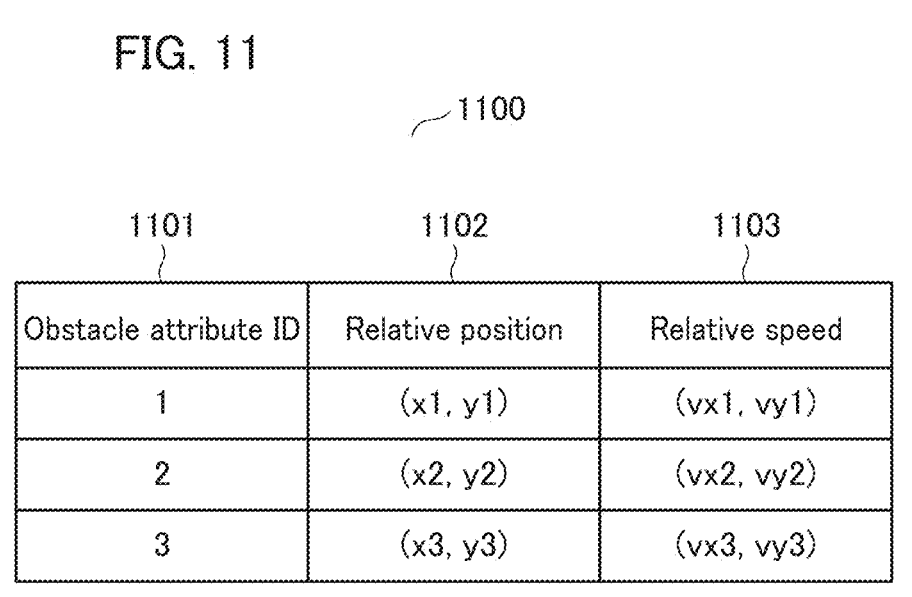

FIG. 11 is a diagram showing an example of the obstacle attribute table 1100 used for managing the attributes of obstacles. Each row of the obstacle attribute table 1100 represents the attribute of one obstacle. IDs unique to the respective obstacles for uniquely identifying the attribute of the obstacle that has been stored in the obstacle attribute table 1100 are described in an obstacle attribute ID 1101.

In the field of a relative position 1102, a relative position of the obstacle to the movable apparatus 809 is described. In the field of a relative speed 1103, a relative speed of the obstacle with respect to the movable apparatus 80) is described. In the sixth embodiment, it is assumed that three obstacles are detected. Therefore, although a table based on the attributes of three obstacles is formed in the obstacle attribute table as shown in FIG. 11, as the number of obstacles increases, the number of rows of the obstacle attribute table shown in FIG. 11 increases.

Figure 12:
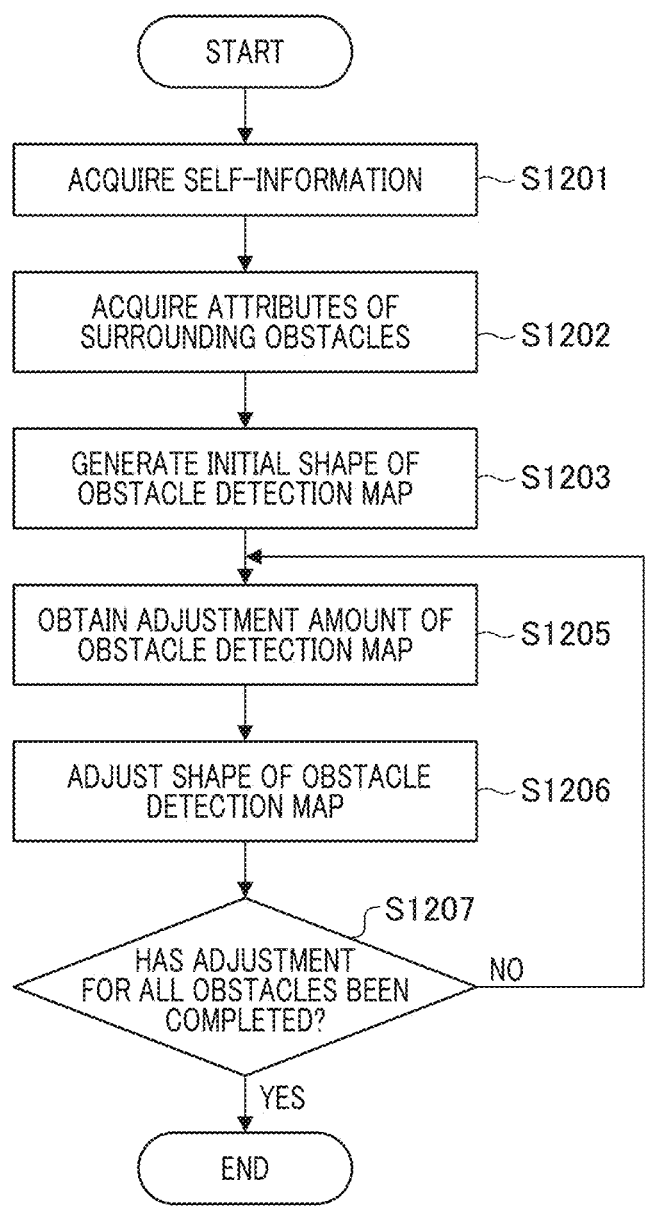
FIG. 12 is a flowchart illustrating an example of processing for adjusting obstacle detection parameters based on the attributes of obstacles in the sixth embodiment.

FIG. 12 is a flowchart illustrating an example of processing of adjusting an obstacle detection parameter based on the attribute of the obstacle in the sixth embodiment. Note that the CPU 801 serving as a computer in the information processing apparatus 800 executes a computer program that is stored in the memory, whereby the operation of each step in the flowchart of FIG. 12 is performed.

In the flow of FIG. 12, the attributes of obstacles that are present around the movable apparatus 809 are acquired, and the obstacle detection parameters are adjusted based on the acquired attributes. In addition, the processes of the flow of FIG. 12 are repeatedly executed at regular intervals.

In step S1201, the self-information acquisition unit 901 acquires information on the movable apparatus 809. In step S1202 (obstacle attribute acquiring step), the obstacle attribute acquisition unit 902 first resets the contents of the obstacle attribute table 1100. Next, the obstacle attribute acquiring unit 902 acquires the attributes of obstacles that are present around the movable apparatus 809 and stores the attributes in the obstacle attribute table 1100.

In step S1203, the obstacle detection parameter adjustment unit 903 generates an initial shape of the obstacle detection map. Then, in subsequent steps S1204 to S1206, the obstacle detection parameter adjustment unit 903 adjusts the shape of the obstacle detection map.

Figure 13A:
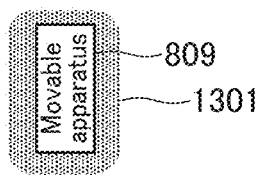
FIGS. 13A to 13C are explanatory diagrams regarding the generation of an initial shape of an obstacle detection map.
Figure 13B:
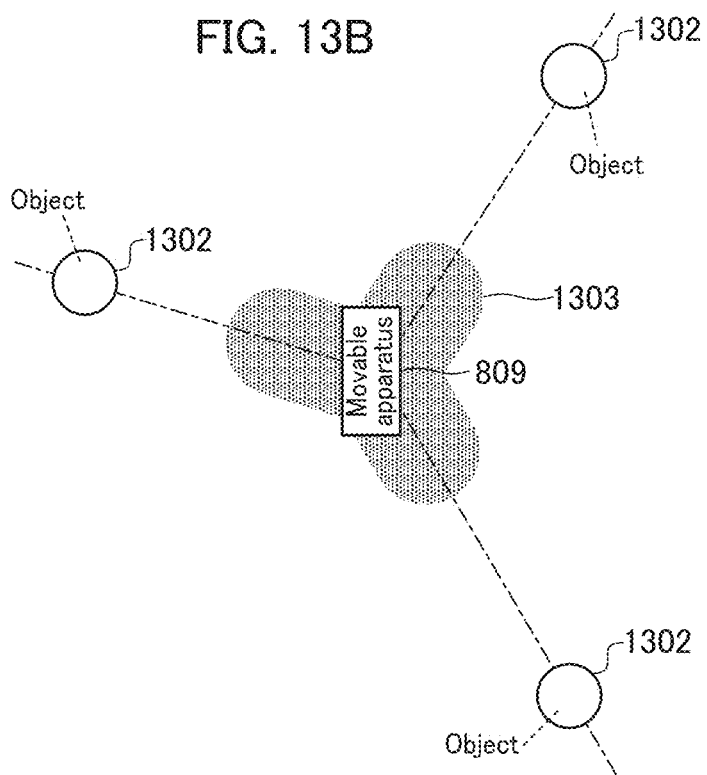
Figure 13C:
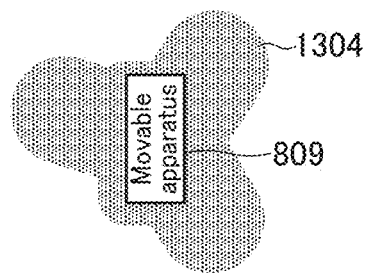

FIGS. 13A to 13C are explanatory diagrams regarding generation of the initial shape of the obstacle detection map, and FIG. 13A illustrates a shape component 1301 that has been generated based on the self-information acquired in step S1201 in the initial shape of the obstacle detection map. For example, a shape considering the shape of the movable apparatus 809 is generated around the movable apparatus 809. That is, the obstacle detection parameter adjustment unit 903 adjusts the shape of the obstacle detection region based on the information regarding the movable apparatus.

FIG. 13B illustrates a shape component 1303 that has been generated based on the relative position of obstacles 1302 with respect to the movable apparatus 809, which has been acquired in step S1202, among the initial steps of the obstacle detection map. For example, a shape that extends from the movable apparatus 809 toward each of the obstacles is generated on a straight line connecting the movable apparatus 809 and each of the obstacles.

That is, the obstacle detection parameter adjustment unit 903 adjusts the shape of the obstacle detection region based on the attributes of the obstacles. Here, it is assumed that the length of the obstacle detection map on the straight line connecting the movable apparatus 809 and the obstacle is fixed to any obstacle.

FIG. 13C illustrates an initial shape 1304 of the obstacle detection map. Here, the initial shape 1304 generated in step S1203 is generated as a union of sets of the shape components 1301 and 1303.

Subsequently, in step S1205, the obstacle detection parameter adjustment unit 903 obtains an adjustment amount of the obstacle detection map based on the attribute of each of obstacles that has been stored in the obstacle attribute table 1100, and adjusts the obstacle detection map in step S1206. Then, the obstacle detection parameter adjustment unit 903 repeats the processes from steps S1207 to S1207 until it is determined in step S1205 that the adjustment has been completed for all the obstacles. Hereinafter, the details of the processes from step S1205 to step S1207 will be explained.

First, in step S1205, the obstacle detection parameter adjustment unit 903 calculates an adjustment amount for adjusting the shape of the obstacle detection map based on the attribute of each of the obstacles in the above repetition. That is, the attribute (relative position 1102, relative speed 1103) of each of obstacles is acquired in the above repetition from the obstacle attribute table 1100 in FIG. 11. Next, with respect to the relative speed 1103, a component vector on a straight line connecting the movable apparatus 809 and the obstacle is obtained.

Figure 14A:
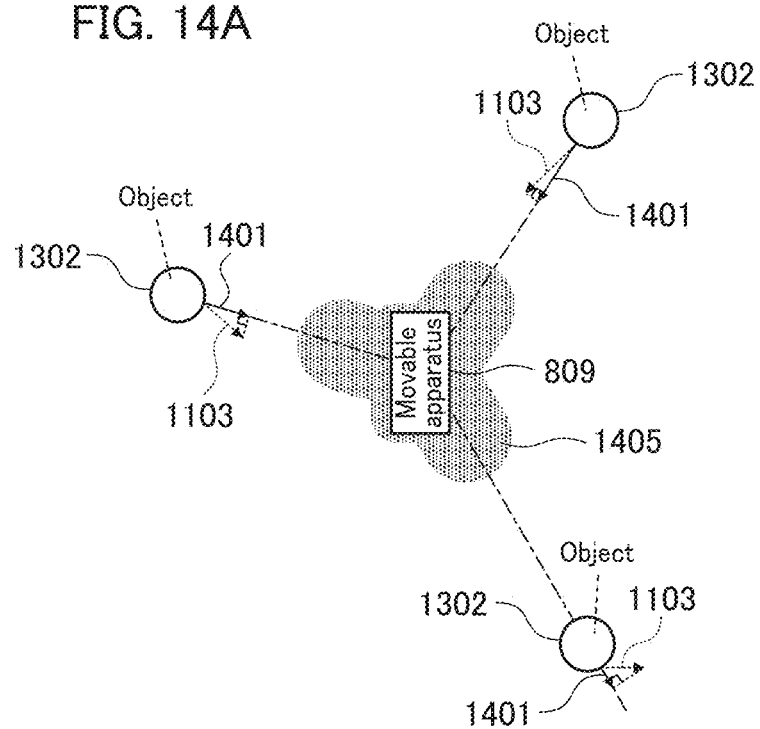
FIGS. 14A and 14B are explanatory diagrams regarding the calculation of an adjustment amount.
Figure 14B:
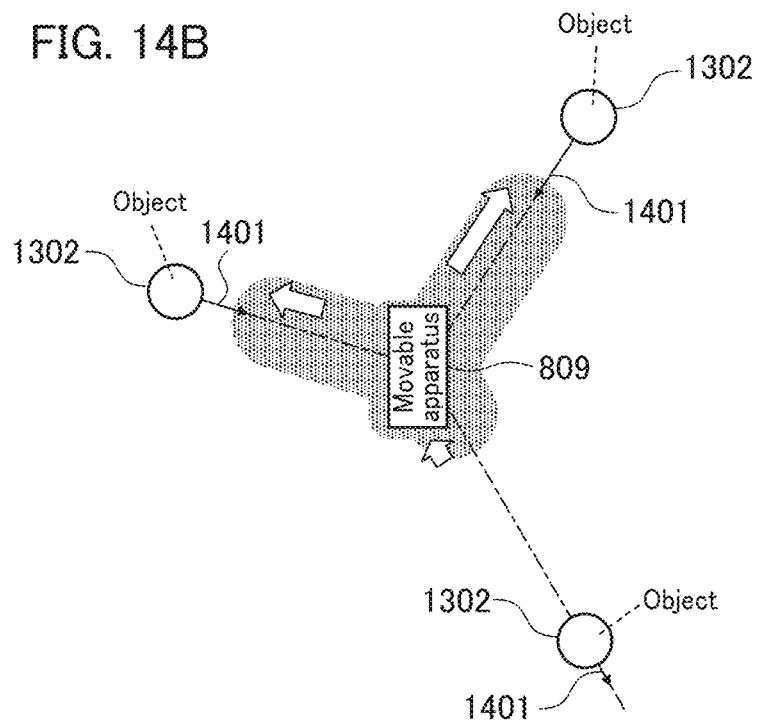

FIGS. 14A and 14B are explanatory diagrams related to the calculation of the adjustment amount, and explain the processing contents in step S1205 and step S1206. FIG. 14A illustrates a state in which, in step S1205, the component vector on the straight line connecting the movable apparatus 809 and the obstacles 1302 are obtained with respect to the relative speed 1103.

Reference numeral 1401 denotes a component vector of the relative speed 1103 on a straight line connecting the movable apparatus 809 and the obstacle. To obtain the component vector 1401, first, a perpendicular line is drawn from the relative speed 1103 to the straight line connecting the movable apparatus 809 and the obstacles 1302, and an intersection point with the straight line is obtained. Then, a vector from the obstacles 1302 to the intersection point is calculated as the component vector 1401.

Addition, in step S1205, the adjustment amount is obtained by the following Formula 1. Here, when the component vector 1401 is in the opposite direction to the vector from the movable apparatus 809 toward the obstacles 1302, the "orientation" in Formula 1 is 1, and when the component vector 1401 is in the forward direction to the vector from the movable apparatus 809 toward the obstacles 1302, the "direction" in Formula 1 is −1. The "speed" in Formula 1 corresponds to the magnitude of the component vector 1401.

$$\text{Amount of adjustment} = \text{Orientation} * \text{Speed} \quad [\text{Formula 1}]$$

In step S1206, the obstacle detection parameter adjustment unit 903 adjusts the shape of the obstacle detection map in the direction in which the obstacle is present based on the adjustment amount that has been calculated in step S1205. When the adjustment amount in Formula 1 is a positive value, the shape in the direction in which the obstacle is present in the obstacle detection map is enlarged so as to be extended in proportion to the absolute value of the adjustment amount. When the adjustment amount in Formula 1 is a negative value, the shape in the direction in which the obstacle is present in the obstacle detection map is reduced so as to be extended in proportion to the absolute value of the adjustment amount.

In FIG. 14B, a state in which the shape of the obstacle detection map is adjusted based on the adjustment amount that has been calculated in step S1205 is shown. A state is shown in which the shape in the direction of the obstacle is enlarged as the degree of approach of the obstacle toward the movable apparatus increases. Contrariwise, a state in which the shape in the direction of the obstacle is reduced when the obstacle moves away from the movable apparatus is also shown.

In step S1206, as shown in FIGS. 14A and 14B, as the speed at which the obstacle relatively approaches increases, the shape of the obstacle detection map is enlarged in the direction of the obstacle. In contrast, as the speed at which the obstacle relatively moves away increases, the shape of the obstacle detection map is reduced in the direction in which the obstacle is present.

Additionally, the processes from step S1205 to step S1207 are repeated until it is determined in step S1207 that the adjustment has been completed for all the obstacles. In addition, when it is determined in step S1207 that the adjustment has been completed for all the obstacles, the flow of FIG. 12 ends. Here, step S1205 to step S1207 function as an obstacle detection parameter adjustment step of adjusting the obstacle detection parameter related to the detection of the obstacle based on the attribute of the obstacle that has been acquired in step S1202.

Figure 15:
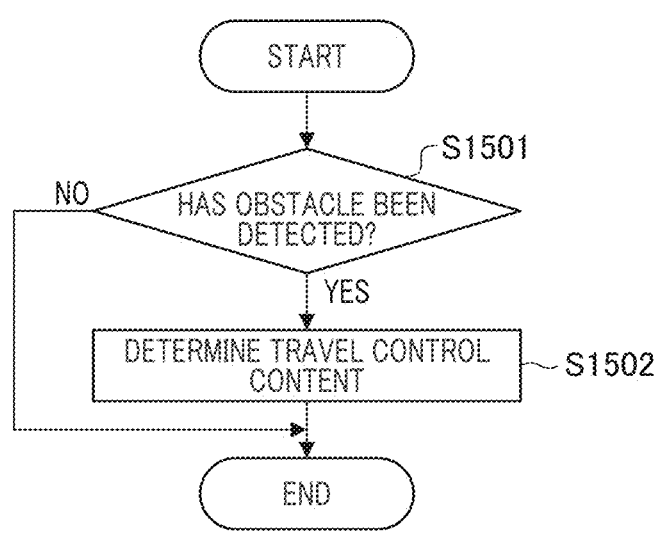
FIG. 15 is a flowchart illustrating processes for determining travel control content according to the sixth embodiment.

FIG. 15 is a flowchart illustrating the processing for determining the travel control content according to the sixth embodiment, and illustrates processing for determining the travel control content of the movable apparatus 809 in a case in which an obstacle is detected. Note that the CPU 801 serving as a computer in the information processing apparatus 800 executes a computer program that is stored in the memory, whereby the operation of each step in the flowchart of FIG. 15 is performed. Note that the processes of the flow in FIG. 15 are repeatedly executed at regular intervals.

In step S1501, the obstacle detection unit 904 determines whether or not an obstacle has been detected in the obstacle detection map that has been adjusted in step S1206 of FIG. 12. Here, step S1501 functions as an obstacle detection step of detecting an obstacle based on the parameter that has been adjusted in the obstacle detection parameter adjustment step. When an obstacle is detected, the process proceeds to step S1502. When an obstacle is not detected in step S1501, the flow of FIG. 15 ends.

In step S1502, the travel control content determination unit 905 determines the travel control content of the movable apparatus 809 based on the attributes (position, speed, and the like) of the detected obstacle. That is, the travel control content determination unit 905 performs travel control (moving control) including one or more of stopping the movable apparatus 809, decelerating the movable apparatus 809, and causing the movable apparatus 809 to avoid the obstacle, with respect to the detected obstacle.

As explained above, in the present embodiment, it is possible to generate the optimum obstacle detection map based on the attribute of the surrounding obstacles by adjusting the obstacle detection parameters based on the acquired attributes of the obstacle, and it is possible to improve the efficiency and safety of the operation of the movable apparatus.

In the present embodiment, the relative position and the relative speed of the obstacle with respect to the movable apparatus 809 have been described as an example of the attribute of the obstacle that can be acquired by using the sensor 807. However, the attribute of the obstacle that can be acquired may be, for example, the type, the height of the obstacle, the type of the cargo, and the like.

Additionally, the obstacle attribute acquisition unit 902 may acquire the attributes of the obstacle by directly communicating with the obstacle. Consequently, it is possible to acquire the attribute of the obstacle that is difficult for the sensor 807 to acquire, and to generate an optimal obstacle detection map.

Note that examples of the attributes of the obstacle that are difficult to be acquired by the sensor 807 include attributes related to influence of a collision with an obstacle, such as a price, fragility, and soiling resistance of the obstacle. Additionally, the examples of the attribute include attributes related to perception characteristics and detection characteristics of the obstacle itself, such as an age and a visual field of the obstacle, a detection range of the obstacle itself, and a detection frequency of the obstacle itself.

In addition, there are attributes related to the motion performance of obstacles such as a weight of the obstacle, a weight of a cargo, a braking performance of the obstacle, and ease of falling, which are the characteristics of the obstacle. Additionally, there are attributes related to tasks (works) of the obstacle such as a content and a type of task that the obstacle is executing, and a type of cargo.

In the present embodiment, a parameter related to a space such as a shape of the obstacle detection map has been explained as an example of the obstacle detection parameter, any parameter may be used if it is a parameter related to obstacle detection. However, for example, there is a spatial resolution of obstacle detection, which is used as a parameter related to a space similar to the shape of the obstacle detection map.

Additionally, the parameters related to time include a parameter related to time such as the frequency of obstacle detection processing. That is, an obstacle with a relatively high approach speed may be adjusted to relatively increase the spatial resolution for detecting the obstacle or to relatively increase the frequency of detecting the obstacle based on the attribute of the obstacle. As described above, the obstacle detection parameters in the present embodiment includes a parameter related to space or time.

Note that the reliability of the attributes of the obstacles may be acquired together when the attributes of the obstacles are acquired. In this case, the obstacle detection parameter may be adjusted based on the reliability. Here, the reliability of the attribute of the obstacle indicates the accuracy of the means for acquiring the attribute. For example, in the case in which an attribute of an obstacle, which is a relative position of the obstacle to a movable apparatus, can be acquired with an error of N meters, and the case in which the attribute can be acquired with an error of M meters (M is a positive real number larger than N), it is considered that the reliability of the attribute of the obstacle is higher in the former case.

Then, if the degree of reliability of the obstacle attribute is low, the obstacle detection parameters are adjusted so that obstacles are more easily detected. If the degree of reliability of the obstacle attribute is high, the obstacle detection parameters are adjusted so that the obstacle is less likely to be detected.

As a specific example, the case in which the attribute of the obstacle is, for example, the relative position of the obstacle to the movable apparatus and the obstacle detection parameter is the shape of the obstacle detection map will be explained. Under these conditions, if the reliability of the obstacle attribute is low, for example, the detection region in the direction of the obstacle in the obstacle detection map may be extended in a direction perpendicular to the straight line connecting the movable apparatus and the obstacle.

Note that the obstacle detection parameters may be adjusted based on the acquisition frequency of the attributes of obstacles. The acquisition frequency of the attributes of obstacles is specifically, for example, the frequency of executing the process of obtaining the attributes of obstacles (step S1202). That is, when the acquisition frequency of the attributes of obstacles is low, the obstacle detection parameters are adjusted so that obstacles are more easily detected. When the acquisition frequency of the attributes of obstacles is high, the obstacle detection parameters are adjusted so that obstacles are less likely to be detected.

Specifically, in a case in which the obstacle detection parameter is the shape of the obstacle detection map, when the acquisition frequency of the attributes of obstacles is low, for example, the obstacle detection map may be extended in all directions. In contrast, when the acquisition frequency of the attributes of obstacles is high, the obstacle detection map may be narrowed in the direction of the obstacle.

Although, in the present embodiment, the method using an obstacle detection map, which is a method of obstacle detection, has been explained, the obstacle detection map may be a weighted map with a weight value at each coordinate.

That is, for example, during generation of the initial detection map, the obstacle detection parameter adjustment unit 903 sets weight values for each coordinate of the obstacle detection region based on the attribute of the obstacle. In this case, a weight value may be set based on, for example, a distance between the movable apparatus and the obstacle. At this time, as the distance between the movable apparatus and the obstacle becomes closer, the weight value is set higher.

In addition, when obstacle detection is performed, the obstacle detection unit 904 may refer to the weight value that each coordinate on the obstacle detection map has. For example, it may be determined that an obstacle has been detected when it enters a region with a weight value equal to or greater than a given threshold in the obstacle detection map. It may also be determined that an obstacle in the obstacle detection map has been detected when the sum of the weight values of the region where the obstacle is present in the obstacle detection map is equal to or greater than a given threshold.

Note that the travel control content determination unit 905 may determine the control content based on the weight value that each coordinate in the obstacle detection map has. For example, the average value of the weight value in the region where the obstacle is present in the obstacle detection map may be obtained, and a deceleration amount may be determined in proportion to the obtained average value.

Seventh Embodiment

The information processing apparatus of the seventh embodiment acquires attributes of obstacles that are present around a movable apparatus from a central management device that manages the attributes of the obstacles in an integrated way, and adjusts an obstacle detection parameter based on the acquired attributes of the obstacles.

Figure 16:
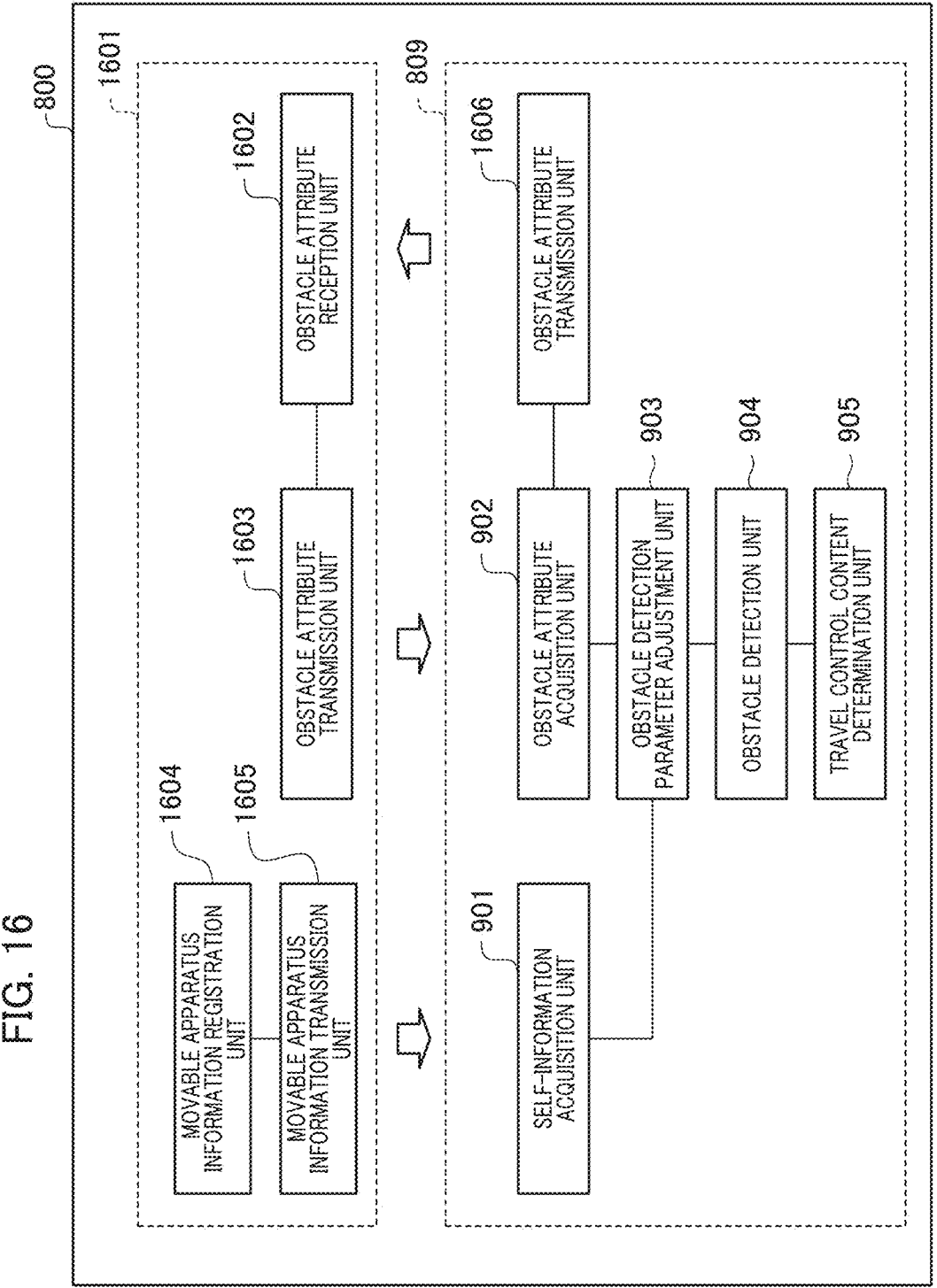
FIG. 16 is a functional block diagram showing a functional configuration of the information processing apparatus 800 according to the seventh embodiment.

FIG. 16 is a functional block diagram showing the functional configuration of the information processing apparatus 800 according to the seventh embodiment. Reference numeral 800 denotes an information processing apparatus, reference numeral 809 denotes a movable apparatus, and reference numerals 901 to 905 are the same as those in the sixth embodiment, and the description thereof will be omitted. In the present embodiment, an example of a relative position of the obstacle with respect to the movable apparatus and a relative speed of the obstacle with respect to the movable apparatus, which are used as the attributes of the obstacles, will be explained.

Reference numeral 1601 denotes a central management device functioning as a management server. Additionally, a CPU serving as a computer and a memory storing computer programs are included inside the central management device 1601. Reference numeral 1602 denotes an obstacle attribute reception unit, and reference numeral 1606 denotes an obstacle attribute transmission unit for externally transmitting the attribute of the obstacle that has been acquired by the movable apparatus 809. The obstacle attribute reception unit 1602 receives the attribute of the obstacle that has been transmitted by the obstacle attribute transmission unit 1606 of the movable apparatus 809, and stores the attribute in the obstacle attribute table 1700, which will be described below, of the central management device 1601.

Reference numeral 1603 denotes an obstacle attribute transmission unit that is provided in the central management device 1601. The obstacle attribute transmission unit 1603 receives an obstacle attribute acquisition request from the movable apparatus 809 and transmits the attribute of the obstacle around the movable apparatus 809 based on the acquisition request. When the movable apparatus 809 transmits the acquisition request, information on the current location of the movable apparatus 809 may be included.

In the case in which the acquisition request includes information on the current location, an attribute of the obstacle that is present within a predetermined range around the current location of the movable apparatus 809 is retrieved from the obstacle attribute table 1700 of the central management device 1601, which will be described below, and transmitted to the movable apparatus 809.

Reference numeral 1604 denotes a movable apparatus information registration unit that receives input of information on a plurality of movable apparatuses from a user, and stores and registers the input information on the plurality of movable apparatuses in a movable apparatus information table 1800, which will be described below. Here, the information on the movable apparatus is static information regarding the shape, the braking performance, and the like of the movable apparatus.

Reference numeral 1605 denotes a movable apparatus information transmission unit that receives an acquisition request for information on movable apparatuses stored in the movable apparatus information table 1800, which will be described below, from the self-information acquisition unit 901 of the movable apparatus 809. Additionally, the movable apparatus information transmission unit 1605 transmits the information on movable apparatuses stored in the movable apparatus information table 1800, based on the acquisition request. The acquisition request may include an ID for uniquely identifying the movable apparatus 809.

Based on the ID of the movable apparatus 809 included in the acquisition request, the information on the movable apparatus identified by this ID is retrieved from the movable apparatus information table 1800, which will be described below, and transmitted to the movable apparatus 809. As described above, reference numeral 1606 is the obstacle attribute transmission unit that transmits the attribute of the obstacle that has been acquired by the obstacle attribute acquisition unit 902 to the central management device 1601.

Figure 17:
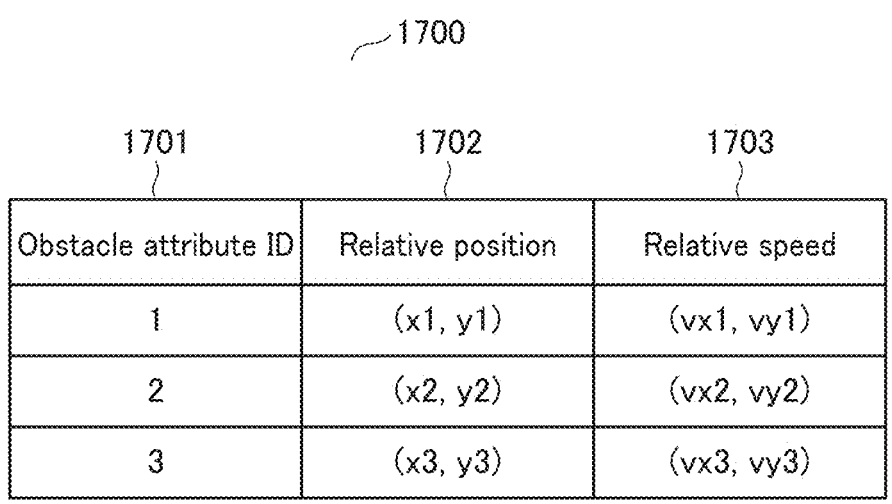
FIG. 17 is a diagram illustrating an example of an obstacle attribute table 1700 that is used by a central management device 1601 to manage the attributes of obstacles.

FIG. 17 is a diagram illustrating an example of the obstacle attribute table 1700 that is used by the central management device 1601 to manage the attribute of the obstacle, and the obstacle attribute table 1700 has the same configuration as the obstacle attribute table 1100 in the sixth embodiment. That is, each row of the obstacle attribute table 1700 represents the attribute of one obstacle. In the field of an obstacle attribute ID 1701, IDs for uniquely identifying the attributes of the obstacles that have been stored in the obstacle attribute table 1700 are described.

In the field of a relative position 1702, the relative position of the obstacle to the movable apparatus 809 is described. In the field of a relative speed 1703, the relative speed of the obstacle to the movable apparatus 809 is described. Note that, in the obstacle attribute table 1700, the attributes regarding the obstacle that have been acquired from a plurality of movable apparatuses 809 are stored. Furthermore, for example, the attribute regarding the obstacle that has been acquired from cameras arranged in a plurality of locations, and the attribute regarding the obstacle that has been input by the user in advance may be stored.

FIG. 18 is a diagram illustrating an example of the movable apparatus information table 1800 used to manage the information on movable apparatuses. Each row of the movable apparatus information table 1800 represents information on one movable apparatus. In the field of a movable apparatus information ID 1801, IDs for uniquely identifying the information on movable apparatuses stored in the movable apparatus information table 1800 are described.

In the field of a shape 1802, information indicating the shape of the movable apparatus 809 is described. The information indicating the shape includes two-dimensional point clouds that represent the top view of a shape, and three-dimensional point clouds that represent three-dimensional shapes. In the present embodiment, the example of a two-dimensional point cloud that represents the top view of a shape, which is one example of the shape, is shown.

In the field of a braking performance 1803, an index indicating how the brake of the movable apparatus 809 works (braking performance) is described. In the present embodiment, a braking distance (unit: meter) is shown as an example of the braking performance.

Figure 19:
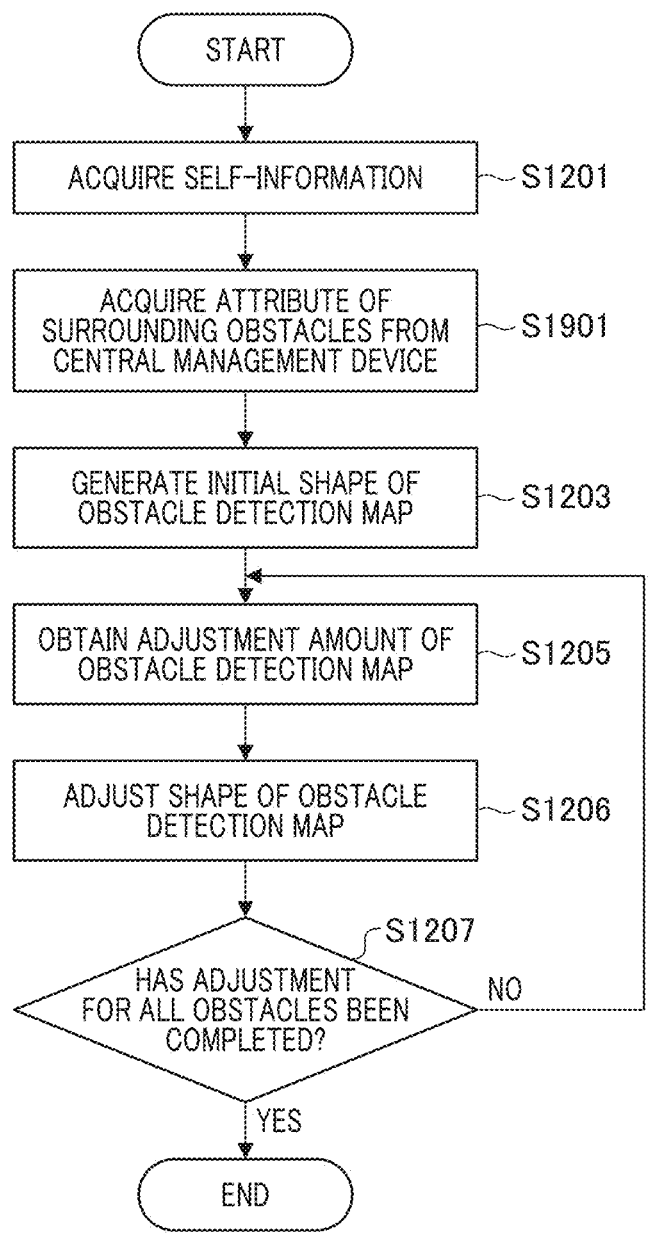
FIG. 19 is a flowchart illustrating processes for adjusting obstacle detection parameters based on the attributes of obstacles in the seventh embodiment.

FIG. 19 is a flowchart illustrating processing of adjusting an obstacle detection parameter based on the attributes of obstacles in the seventh embodiment. Note that the CPU 801 serving as a computer in the information processing apparatus 800 executes a computer program that is stored in the memory, whereby the operation of each step in the flowchart of FIG. 19 is performed.

In FIG. 19, the attributes of the obstacles that are present around the movable apparatus 809 are acquired from the central management device 1601, and the obstacle detection parameters are adjusted based on the acquired attributes. Note that the flow of FIG. 19 is repeatedly executed at regular intervals. Note that the steps to which the same numbers as those in FIG. 12 are applied are the same processes, and the description thereof will be omitted.

In step S1901, first, the obstacle attribute acquisition unit 902 resets the content of the obstacle attribute table 1100. Next, the obstacle attribute obtaining unit 902 transmits a request for obtaining the attributes of the obstacles that are present around the movable apparatus 809 to the central management device 1601.

The obstacle attribute transmission unit 1603 of the central management device 1601 receives the request for acquiring the attributes of the obstacles that are present around the movable apparatus 809, which has been transmitted from the movable apparatus 809. Then, the obstacle attribute transmission unit 1603 acquires the attribute of the obstacle that is present around the movable apparatus 809 from the obstacle attribute table 1700 of the central management device 1601 based on the acquisition request.

Then, the obstacle attribute transmission unit 1603 transmits the acquired attribute of the obstacle to the movable apparatus 809. The obstacle attribute acquiring unit 902 receives the attribute of the obstacle that has been transmitted from the obstacle attribute transmission unit 1603 of the central management device 1601, and stores the attribute in the obstacle attribute table 1100 of the movable apparatus 809. The subsequent processes in steps S1203 to S1207 are the same as the processes in FIG. 12.

As explained above, in the seventh embodiment, the attribute of the obstacle that is present around the movable apparatus is acquired from the central management device 1601 serving as a management server that manages the attribute of the obstacle in an integrated way, and the obstacle detection parameter is adjusted based on the acquired attribute of the obstacle.

Accordingly, it is possible to use an obstacle detection parameter based on the attribute of an obstacle that is present in a blind spot and the like of the movable apparatus 809, which cannot be directly acquired by the movable apparatus 809 using the sensor 807, and to improve the efficiency and safety of the work of the movable apparatus 809. Note that, at this time, the movable apparatus 809 may simultaneously use the attribute of a surrounding obstacle that can be acquired by using the sensor 807.

Note that, in step S1901 of FIG. 19, the attribute of the obstacle may be acquired from the central management device 1601, and the attribute of the obstacle that is present around the movable apparatus 809 may be acquired by using the sensor 807 of the movable apparatus 809 and transmitted to the central management device 1601.

That is, the obstacle attribute transmission unit 1606 of the movable apparatus 809 transmits the attribute of the obstacle that has been acquired by using the sensor 807 to the central management device 1601. The obstacle attribute reception unit 1602 receives the attribute of the obstacle that has been transmitted from the movable apparatus 809, and stores the attribute in the obstacle attribute table 1700.

Note that, at this time, the attributes (for example, the position and the speed) of the shared obstacle may be statistically processed and corrected based on the attributes of the obstacles that have been received from a plurality of movable apparatuses. Consequently, the accuracy of the attributes of the shared obstacle can be increased.

Although, in the above-described embodiment, an example of an autonomous mobile robot including an automated guided vehicle (AGV) and an autonomous mobile robot (AMR) has been described as a movable apparatus, the movable apparatus may be, for example, an automobile, a train, a ship, an airplane, a robot, and a drone that perform automatic driving or driving support, and may be any movable apparatus if it is movable.

Additionally, at least a part of the information processing system according to the embodiment may be or may not necessarily be mounted on the movable apparatus. Additionally, the present invention can be applied to a case in which the movable apparatus is remotely controlled. Additionally, the present invention may be applied to a system configured by a plurality of devices, or an apparatus including one device.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing apparatuses through a network or various storage media. Then, a computer (or a CPU, an MPU, or the like) of the information processing apparatuses may be configured to read and execute the program. In such a case, the program and the storage medium storing the program configure the present invention.

Additionally, the present invention includes those realized by using, for example, at least one processor or circuit configured to function of the embodiments explained above. Note that, decentralized processing may be performed by using a plurality of processors.

This application claims the benefit of Japanese Patent Application No. 2022-163188, filed on Oct. 11, 2022, and Japanese Patent Application No. 2022-198567, filed on Dec. 13, 2022, both of which are hereby incorporated by reference herein in its entirety.

What is claimed is:

1. An information processing apparatus comprising:
at least one processor or circuit configured to function as:
a passing region calculation unit configured to calculate a passing region through which a movable apparatus passes;
a first object detection unit configured to detect an object around the movable apparatus using a first sensor;
a second object detection unit configured to detect an object around the movable apparatus using a second sensor;
an object detection range setting unit configured to set an object detection range in which the object is detected by the second object detection unit; and
an object identification unit configured to identify the object based on a feature of the object detected by the first object detection unit,
wherein an operation range of the object identified by the object identification unit is estimated, and
wherein, in the case where the object identification unit determines that the object is immovable or does not approach the movable apparatus, the object detection range setting unit sets a nearest distance to the object detected by the first object detection unit as the object detection range.

2. The information processing apparatus according to claim 1, wherein the passing region includes a region through which a connected object that is connected to the movable apparatus or a cargo loaded on the movable apparatus passes.

3. The information processing apparatus according to claim 1, wherein the object detection range setting unit performs setting such that at least the passing region calculated by the passing region calculation unit is included in the object detection range.

4. The information processing apparatus according to claim 3, wherein the object detection range setting unit changes at least one of a parameter of the first sensor or the second sensor and a parameter of the object detection unit so that the object detection range includes at least the passing region calculated by the passing region calculation unit.

5. The information processing apparatus according to claim 3, wherein the passing region calculation unit calculates the passing region based on a braking performance, a traveling speed, and a route of the movable apparatus.

6. The information processing apparatus according to claim 1, wherein the object detection range setting unit sets the object detection range based on a stop distance of the movable apparatus.

7. The information processing apparatus according to claim 1, wherein display control or drive control of the movable apparatus is performed based on a detection result of the object detected in the object detection range.

8. An information processing apparatus comprising:
at least one processor or circuit configured to function as:
a first object detection unit configured to detect an object around a movable apparatus using a first sensor;
a second object detection unit configured to detect an object around the movable apparatus using a second sensor;
an object detection range setting unit configured to set an object detection range in which the object is detected by the second object detection unit;
an object identification unit configured to identify the object based on a feature of the object detected by the first object detection unit; and
an object operation range estimation unit configured to determine an operation range of the object identified by the object identification unit,
wherein, in the case where the object operation range estimation unit determines that the object moves in direction that is the same as a movement direction of the movable apparatus, the object detection range setting unit sets a nearest distance to the object detected by the first object detection unit as the object detection range.

9. The information processing apparatus according to claim 8, wherein the object detection range setting unit sets the object detection range based on the positional relation between the object identified by the object identification unit and the movable apparatus.

10. An information processing method comprising:
calculating a passing region through which a movable apparatus passes;
detecting an object around the movable apparatus using a first sensor;
detecting an object around the movable apparatus using a second sensor;
setting an object detection range in which the object is detected in the detecting an object using the second sensor;
identifying the object based on a feature of the object detected using the second sensor,
wherein an operation range of the identified object is estimated,
wherein, in the case where the identified object is determined to be immovable or does not approach the movable apparatus, a nearest distance to the object detected using the first sensor is set as the object detection range.

11. An information processing method comprising:
performing a first object detection in which an object around a movable apparatus is detected using a first sensor;
performing a second object detection in which an object around the movable apparatus is detected using a second sensor;
setting an object detection range in which the object is detected in the second object detection,
identifying the object based on a feature of the object detected in the first object detection; and
estimating an operation range of the object identified in the identifying the object;
wherein, in the case where it is determined that the object moves in direction that is the same as a movement direction of the movable apparatus in the estimate of the operation range of the object, a nearest distance to the object detected in the first object detection is set as the object detection range.

12. A non-transitory computer-readable storage medium configured to store a computer program comprising instructions for executing following processes:
calculating a passing region through which a movable apparatus passes;
detecting an object around the movable apparatus using a first sensor;
detecting an object around the movable apparatus using a second sensor;
setting an object detection range in which the object is detected in the detecting an object using the second sensor;
identifying the object based on a feature of the object detected using the second sensor,
wherein an operation range of the identified object is estimated,
wherein, in the case where the identified object is determined to be immovable or does not approach the movable apparatus, a nearest distance to the object detected using the first sensor is set as the object detection range.

13. A non-transitory computer-readable storage medium configured to store a computer program comprising instructions for executing following processes:
performing a first object detection in which an object around a movable apparatus is detected using a first sensor;
performing a second object detection in which an object around the movable apparatus is detected using a second sensor;
setting an object detection range in which the object is detected in the second object detection, identifying the object based on a feature of the object detected in the first object detection; and
estimating an operation range of the object identified in the identifying the object;
wherein, in the case where it is determined that the object moves in direction that is the same as a movement direction of the movable apparatus in the estimate of the operation range of the object, a nearest distance to the object detected in the first object detection is set as the object detection range.

14. An information processing apparatus comprising:
at least one processor or circuit configured to function as:
an acquisition unit configured to acquire an increase/decrease state of a relative distance between an object that is present around a movable apparatus and the movable apparatus;
an obstacle detection parameter adjustment unit configured to adjust an obstacle detection parameter to detect the object as an obstacle, based on the increase/decrease state of the relative distance, such that an obstacle detection region between the movable apparatus and the object when the relative distance increases is decreased compared to when the relative distance decreases, and the obstacle detection region between the movable apparatus and the object when the relative distance decreases is enlarged compared to when the state in which the relative distance increases; and an obstacle detection unit configured to detect the obstacle based on a parameter adjusted by the obstacle detection parameter adjustment unit.

15. The information processing apparatus according to claim 14, wherein the at least one processor or circuit is further configured to function as:
a travel control content determination unit configured to determine a control content of the movable apparatus in a case in which the obstacle detection unit detects an obstacle.

16. The information processing apparatus according to claim 14, wherein the acquisition unit acquires a reliability of the increase/decrease state of the relative distance, and
wherein the obstacle detection parameter adjustment unit adjusts the obstacle detection parameter such that the obstacle detection region is enlarged when the reliability is low compared to when the reliability is high.

17. The information processing apparatus according to claim 14, wherein the acquisition unit acquires an attribute of the object by using a sensor provided on the movable apparatus.

18. The information processing apparatus according to claim 14, wherein the acquisition unit acquires an attribute of the obstacle by communicating with the object.

19. The information processing apparatus according to claim 14, wherein the acquisition unit acquires an attribute of an object from a central management device that manages attributes of objects.

20. The information processing apparatus according to claim 14, wherein the at least one processor or circuit is further configured to function as:
a self-information acquisition unit configured to acquire information on the movable apparatus, and
wherein the obstacle detection parameter adjustment unit adjusts the obstacle detection parameter based on information on the movable apparatus.

21. The information processing apparatus according to claim 14, wherein in a case where there are a plurality of the objects, the acquiring unit acquires the increase/decrease state of the relative distance to the movable apparatus for each of the objects, and
wherein the obstacle detection parameter adjustment unit adjusts the obstacle detection parameter related to the obstacle detection region for each of the objects.

22. A movable apparatus comprising:
at least one processor or circuit configured to function as:
an acquisition unit configured to acquire an increase/decrease state of a relative distance between an object that is present around a movable apparatus and the movable apparatus;
an obstacle detection parameter adjustment unit configured to adjust an obstacle detection parameter to detect the object as an obstacle, based on the increase/decrease state of the relative distance, such that an obstacle detection region between the movable apparatus and the object when the relative distance increases is decreased compared to when the relative distance decreases, and the obstacle detection region between the movable apparatus and the object when the relative distance decreases is enlarged compared to when the state in which the relative distance increases;
an obstacle detection unit configured to detect the obstacle based on a parameter adjusted by the obstacle detection parameter adjustment unit; and
a moving control unit configured to perform moving control of the movable apparatus based on the obstacle that has been detected by the obstacle detection unit.

23. An information processing method comprising:
acquiring increase/decrease state of a relative distance between an object that is present around a movable apparatus and the movable apparatus;
adjusting an obstacle detection parameter to detect the object as an obstacle, based on the increase/decrease state of the relative distance, such that an obstacle detection region between the movable apparatus and the object when the relative distance increases is decreased compared to when the relative distance decreases, and the obstacle detection region between the movable apparatus and the object when the relative distance decreases is enlarged compared to when the state in which the relative distance increases; and
detecting the obstacle based on a parameter that has been adjusted in adjusting the obstacle detection parameter.

24. A non-transitory computer-readable storage medium configured to store a computer program comprising instructions for executing following processes:
acquiring increase/decrease state of a relative distance between an object that is present around a movable apparatus and the movable apparatus;
adjusting an obstacle detection parameter to detect the object as an obstacle, based on the increase/decrease state of the relative distance, such that an obstacle detection region between the movable apparatus and the object when the relative distance increases is decreased compared to when the relative distance decreases, and the obstacle detection region between the movable apparatus and the object when the relative distance decreases is enlarged compared to when the state in which the relative distance increases; and
detecting the obstacle based on a parameter that has been adjusted in adjusting the obstacle detection parameter.

* * * * *